(12) United States Patent
Mansour et al.

(10) Patent No.: US 11,300,676 B2
(45) Date of Patent: Apr. 12, 2022

(54) RADAR IMAGING FOR ANTENNAS WITH CLOCK AMBIGUITIES

(71) Applicant: Mitsubishi Electric Research Laboratories, Inc., Cambridge, MA (US)

(72) Inventors: Hassan Mansour, Boston, MA (US); Petros T Boufounos, Winchester, MA (US); Muhammad Asad Lodhi, Edison, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 356 days.

(21) Appl. No.: 16/295,102

(22) Filed: Mar. 7, 2019

(65) Prior Publication Data

US 2020/0284900 A1 Sep. 10, 2020

(51) Int. Cl.
*G01S 13/90* (2006.01)
*G01S 7/28* (2006.01)

(52) U.S. Cl.
CPC ............. *G01S 13/904* (2019.05); *G01S 7/28* (2013.01); *G01S 13/9058* (2019.05)

(58) Field of Classification Search
CPC ....... G01S 13/904; G01S 7/28; G01S 13/9058
See application file for complete search history.

(56) References Cited

U.S. PATENT DOCUMENTS

| | | | |
|---|---|---|---|
| 9,870,641 B2* | 1/2018 | Anderson | G01S 13/885 |
| 2015/0022390 A1* | 1/2015 | Mansour | G01S 13/888 |
| | | | 342/22 |
| 2015/0287422 A1* | 10/2015 | Short | G10L 15/26 |
| | | | 704/205 |
| 2017/0146651 A1* | 5/2017 | Liu | G01S 13/9019 |
| 2017/0285158 A1* | 10/2017 | Halbert | G01S 13/878 |
| 2018/0059237 A1* | 3/2018 | Liu | G01S 13/878 |

* cited by examiner

*Primary Examiner* — Donald H B Braswell
(74) *Attorney, Agent, or Firm* — Gennadiy Vinokur; Hironori Tsukamoto

(57) ABSTRACT

A radar system for generating a radar image of a scene includes an input interface to accept radar measurements of a scene collected from a set of antennas with clock ambiguities, wherein the radar measurements are measurements of reflections of a radar pulse transmitted to the scene, a hardware processor configured to solve a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time, and an output interface configured to render the radar image.

17 Claims, 16 Drawing Sheets

---

Algorithm 1: FISTA for distributed radar phase-synchronization

Input: measurements $\{y_m\}_{m=1}^M$, measurement matrices $\{A_m\}_{m=1}^M$, Lipschitz constant $\alpha$, and regularization parameters $\lambda_x, \lambda_z, \gamma$ Initialization: Initial estimate $w^0 = u^0$, $t^0 = 1$ 1: while stopping criteria unsatisfied do
2: $\quad v^j \leftarrow w^{j-1} + \alpha B^H(b - Bw^{j-1})$
3: $\quad \tilde{u}^j \leftarrow \mathcal{T}(v^j, \alpha\lambda)$
4: $\quad u^j \leftarrow P_{\mathcal{Z}_+}(\tilde{u}^j)$
5: $\quad t^j \leftarrow \frac{1+\sqrt{1+4(t^{j-1})^2}}{2}$
6: $\quad w^j \leftarrow u^j + \frac{t^{j-1}-1}{t^j}(u^j - u^{j-1})$
7: end while Output: Final estimate $w^j$ $$w = \begin{bmatrix} x \\ z_1 \\ z_2 \\ \vdots \\ z_M \end{bmatrix}, b = \begin{bmatrix} 0 \\ 0 \\ \vdots \\ 0 \\ \gamma 1 \end{bmatrix}, \lambda = \begin{bmatrix} \lambda_x 1_N \\ \lambda_z 1_P \\ \lambda_z 1_P \\ \vdots \\ \lambda_z 1_P \end{bmatrix}, \text{ and }$$

$$B = \begin{bmatrix} \tilde{A}_1 & -F & 0 & 0 & \cdots & 0 \\ \tilde{A}_2 & 0 & -F & 0 & \cdots & 0 \\ \vdots & \vdots & \vdots & \vdots & \ddots & \vdots \\ \tilde{A}_M & 0 & 0 & 0 & \cdots & -F \\ \gamma 1^T & 0^T & 0^T & 0^T & \cdots & 0^T \end{bmatrix}$$

$$\mathcal{T}(x, \lambda) = \begin{cases} \text{sign}(x_i) \cdot (|x_i| - \lambda), & \text{if } |x_i| \geq \lambda \\ 0, & \text{otherwise.} \end{cases}$$

$$\underset{\mathbf{x},\{\mathbf{z}_m\}_{m=1}^M}{\text{minimize}} \quad \lambda_x \|\mathbf{x}\|_1 + \lambda_z \sum_{m=1}^M \|\mathbf{z}_m\|_1 + \left\| \begin{bmatrix} \tilde{\mathbf{A}}_1 & -\mathbf{F} & \mathbf{0} & \cdots & \mathbf{0} \\ \tilde{\mathbf{A}}_2 & \mathbf{0} & -\mathbf{F} & \cdots & \mathbf{0} \\ \vdots & \vdots & \vdots & \ddots & \vdots \\ \tilde{\mathbf{A}}_M & \mathbf{0} & \mathbf{0} & \cdots & -\mathbf{F} \\ \gamma \mathbf{1}_N^T & \mathbf{0}_P^T & \mathbf{0}_P^T & \cdots & \mathbf{0}_P^T \end{bmatrix} \begin{bmatrix} \mathbf{x} \\ \mathbf{z}_1 \\ \mathbf{z}_2 \\ \vdots \\ \mathbf{z}_M \end{bmatrix} - \begin{bmatrix} \mathbf{0} \\ \mathbf{0} \\ \vdots \\ \mathbf{0} \\ \gamma c \end{bmatrix} \right\|_2^2$$

$$\text{subject to:} \quad \mathbf{x} \geq \mathbf{0}_N , \mathbf{z}_m \geq \mathbf{0}_P , \mathbf{1}^T \mathbf{z}_m = 1 , \forall m$$

FIG. 6B

Algorithm 1: FISTA for distributed radar phase-synchronization

Input: measurements $\{y_m\}_{m=1}^{M}$, measurement matrices $\{A_m\}_{m=1}^{M}$, Lipschitz constant $\alpha$, and regularization parameters $\lambda_x, \lambda_z, \gamma$

Initialization: Initial estimate $w^0 = u^0, t^0 = 1$

1: while stopping criteria unsatisfied do
2: $\quad v^j \leftarrow w^{j-1} + \alpha B^H(b - Bw^{j-1})$
3: $\quad \tilde{u}^j \leftarrow \mathcal{T}(v^j, \alpha\lambda)$
4: $\quad u^j \leftarrow P_{\mathcal{R}_+}(\tilde{u}^j)$
5: $\quad t^j \leftarrow \frac{1 + \sqrt{1 + 4(t^{j-1})^2}}{2}$
6: $\quad w^j \leftarrow u^j + \frac{t^{j-1} - 1}{t^j}(u^j - u^{j-1})$
7: end while

Output: Final estimate $w^j$ $$w = \begin{bmatrix} x \\ z_1 \\ z_2 \\ \vdots \\ z_M \end{bmatrix}, \quad b = \begin{bmatrix} 0 \\ 0 \\ \vdots \\ 0 \\ \gamma 1 \end{bmatrix}, \quad \lambda = \begin{bmatrix} \lambda_x 1_N \\ \lambda_z 1_P \\ \lambda_z 1_P \\ \vdots \\ \lambda_z 1_P \end{bmatrix}, \text{ and}$$

$$B = \begin{bmatrix} \tilde{A}_1 & -F & 0 & \cdots & 0 \\ \tilde{A}_2 & 0 & -F & \cdots & 0 \\ \vdots & \vdots & \vdots & \ddots & \vdots \\ \tilde{A}_M & 0 & 0 & \cdots & -F \\ \gamma 1^T & 0^T & 0^T & \cdots & 0^T \end{bmatrix}$$

$$\mathcal{T}(x_i, \lambda) = \begin{cases} \text{sign}(x_i) \cdot (|x_i| - \lambda), & \text{if } |x_i| \geq \lambda \\ 0, & \text{otherwise.} \end{cases}$$

RADAR IMAGING FOR ANTENNAS WITH CLOCK AMBIGUITIES

TECHNICAL FIELD

The present disclosure relates generally to radar systems, and more particularly to radar imaging by fusing measurements of various antennas with synchronous or asynchronous clocks.

BACKGROUND

High resolution radar imaging is a requirement in a variety of remote sensing applications including synthetic aperture radar (SAR) and through-the-wall radar imaging (TWI). Whereas the down-range resolution is mostly controlled by the bandwidth of the transmitted pulse, the cross-range (azimuth) resolution depends on the aperture of the radar array. Generating a large physical aperture is practically achieved by deploying a number of distributed antennas or arrays, each having a relatively small aperture. A distributed setup allows for flexibility of platform placement, reduces the operational and maintenance costs, and adds robustness to sensor failures. Leveraging prior knowledge of the scene, such as sparsity, the precise knowledge of the antenna positions and a full synchronization of received signals has been shown to significantly improve the radar imaging resolution. However, geographical distribution of an array introduces data coherence problems due to ambiguities in the position of the antennas and/or difficulties in precisely synchronizing the antenna clocks.

For example, the state of the art models the asynchronous clocks as phase errors in the received data. Indeed, a time delay introduced due to clock drift is equivalent to a phase shift that is linear in frequency. To that end, the conventional methods attempts to estimate and correct the phase errors in the data, in order to apply coherent imaging techniques on the corrected data. See, e.g., D. E. Wahl, P. H. Eichel, D. C. Ghiglia, and C. V. Jakowatz, "Phase gradient autofocus-a robust tool for high resolution sar phase correction," IEEE Transactions on Aerospace and Electronic Systems, vol. 30, no. 3, pp. 827-835, 1994. However, a common issue with those solutions is that the estimation of the phase error is not straightforward due to the non-linearity of the resulting formulation and the additional complication of phase wrapping. Furthermore, typical phase models in the literature, such as subspace restrictions, often under-perform because they fail to capture the true nature of the error. As a result, those solutions are not practical.

Therefore, there is a need for radar imaging systems and methods configured for fusing measurements of various antennas with asynchronous clocks.

SUMMARY

It is an object of some embodiments to provide systems and methods for radar imaging by fusing measurements of various antennas. It is another object of some embodiments to provide such a system or a method that is suitable for radar imaging from measurements provided by antennas having clock ambiguities. As used herein, the clock ambiguities indicate that the clocks of the antennas may or may not be synchronized, the antennas can be either synchronous or asynchronous. When antennas have clock ambiguities, some embodiments act under an assumption that the antennas have asynchronous clocks.

Some embodiments are based on recognition that radar imaging problem for distributed antennas with clock ambiguities can be an ill-posed problem with a vast number of unknowns. Specifically, when the radar imaging problem is formulated as determining a radar image from the measurements related to the radar image through a radar operator having uncertainties encoding the clock ambiguities, each measurement of an unknown scene includes an error caused by the asynchronous clocks of the antennas. Moreover, due to non-linearity of relationships between the measurements and the errors in the clocks of the antennas, each sample of the measurements from the same antenna can have a different error, thereby increasing a number of unknowns in the model of the radar imaging problem formed by multiple measurements from multiple antennas. To that end, the formulation of the radar imaging problem that aims to recover the correct radar image from incorrect measurements caused by the incorrect radar operator is nonconvex and difficult ill-posed problem.

Some embodiments are based on recognition that an original problem of radar image recovery is to find a delayed unknown ideal signal of an unknown scene to explain radar measurements. This problem is nonconvex. However, some embodiments reverse this problem to determine an advance (a reverse delay) of the radar measurements that would match the unknown ideal signal. Such a problem transformation allows to decouple the unknown delay from the unknown scene that generates the unknown ideal signal.

In addition, some embodiments are based on realization that the unknown advance, which is an unknown shift of the received signal in time, can be represented as a convolution with an unknown impulse. Such a representation is counterintuitive because expands the dimensionality of the problem. However, the unknown advance affects the data in a nonlinear way, while the convolution by the unknown impulse is a liner operation. In such a manner, the decoupling of the unknowns combined with linearization gained from the convolutional representation result in a convex radar image recovery problem.

However, even after convexification, this problem is still difficult to solve, because the resulting convex problem has a large number of optimal solutions, while only one of them is the desired one. However, some embodiments are based on another realization that the unknown impulse can be represented as an unknown signal, i.e., a shift kernel, that is one-sparse in time. In effect, these realizations allow transforming the original non-convex image recovery problem into a convex sparse recovery problem, which in turn allows to use sparse reconstruction techniques to reduce the size of the solution space of the radar image recovery problem.

To that end, some embodiments solve a convex radar image recovery problem to produce a radar image of the scene. The radar image recovery problem matches an advance of the radar measurements of a scene collected from multiple antennas with clock ambiguities with a signal generated through a radar propagation function of the scene. The advance of the radar measurements is represented as a convolution of the radar measurements with a shift kernel that is one-sparse in time, such that the convex radar image recovery problem is a convex sparse recovery problem solved subject to a sparsity constraint.

Accordingly, one embodiment discloses a radar system for generating a radar image of a scene, including an input interface to accept radar measurements of a scene collected from a set of antennas with clock ambiguities, wherein the radar measurements are measurements of reflections of a radar pulse transmitted to the scene; a hardware processor configured to solve a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time; and an output interface configured to render the radar image.

Another embodiment discloses a radar method for generating a radar image of a scene, wherein the method uses a processor coupled with stored instructions implementing the method, wherein the instructions, when executed by the processor carry out steps of the method including accepting radar measurements of a scene collected from a set of antennas with clock ambiguities, wherein the radar measurements are measurements of reflections of a radar pulse transmitted to the scene; solving a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time; and rendering the radar image.

Yet another embodiment discloses a non-transitory computer readable storage medium embodied thereon a program executable by a processor for performing a method. The method includes accepting radar measurements of a scene collected from a set of antennas with clock ambiguities, wherein the radar measurements are measurements of reflections of a radar pulse transmitted to the scene; solving a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time; and rendering the radar image.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6B shows an exemplar formulation of a convex sparse recovery problem in the matrix form according to some embodiments.

FIG. 6C shows a pseudo code of solving the convex sparse recovery problem according to one embodiment.

DETAILED DESCRIPTION

Figure 1A:
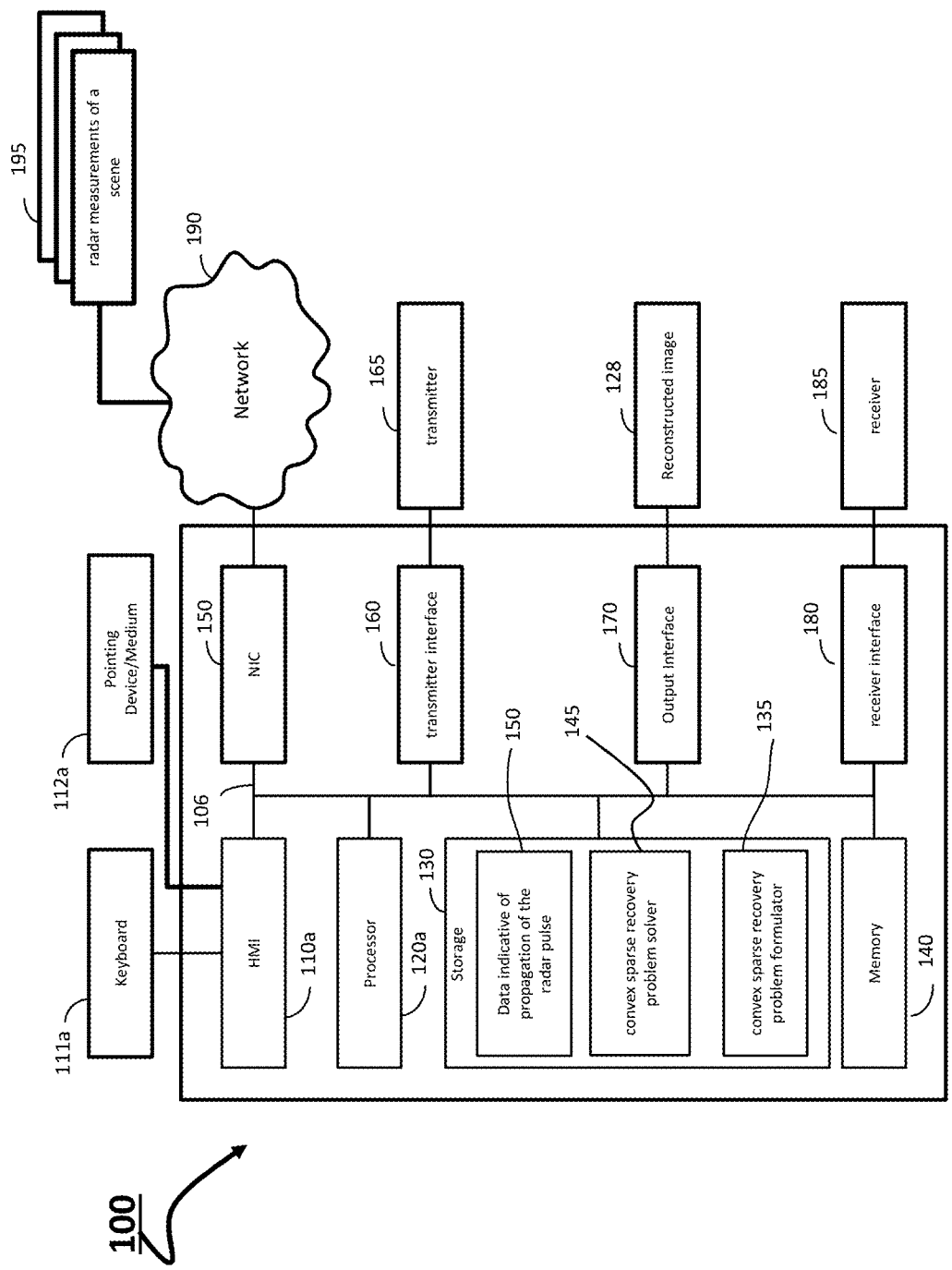
FIG. 1A shows a block diagram of a radar system in accordance with some embodiments.

Various embodiments of the present disclosure relate to systems and methods for radar imaging by fusing measurements of various antennas having unknown timing errors. For example, the present disclosure is based on the recognition that radar synchronization problems of distributed antennas with timing errors can be ill-posed problems with a vast number of unknowns. Specifically, when the radar synchronization problem is formulated as determining a radar image from the measurements related to the radar image through a radar operator having uncertainties encoding the timing errors, each measurement of a region of interest (ROI) of the radar system includes an error caused by the timing errors. Moreover, due to the non-linearity of relationships between the measurements and the timing errors, and the plurality of possible transmitting and receiving antennas, each set of measurements from each transmitter and receiver antenna pair might exhibit different timing errors, thereby increasing a number of unknowns in the model of the radar autofocus problem formed by multiple measurements from multiple antennas. To that end, that formulation of the radar synchronization problem aims to recover the correct radar image from incorrect measurements caused by the incorrect radar operator, which is difficult.

Some embodiments are based on the realization that with respect to a distributed radar system, a clock or timing mismatch that causes a synchronization problem is manifested as a time shift of the transmitted or received signals, when represented in the local clock of each radar transmitter or receiver. For example, if a radar transmitter clock is running fast, i.e., its local clock reaches a certain time stamp at a certain time duration ahead of a global reference clock, then this radar transmitter will transmit a signal that is advanced by the same time duration, compared to the signal it would have transmitted if the radar transmitter's local clock were synchronized with the global reference clock. Similarly, if a radar transmitter clock is running slow, i.e., its local clock reaches a certain time stamp at a certain time duration after of a global reference clock, then this radar transmitter will transmit a signal that is delayed by the same time duration, compared to the signal it would have transmitted if the radar transmitter's local clock were synchronized with the global reference clock.

The inverse relationship holds for the receiver radars in the system. For example, if a radar receiver clock is running fast, i.e., its local clock reaches a certain time stamp at a certain time duration ahead of a global reference clock, then this radar receiver will measure a signal that has local time stamps delayed by the same time duration, compared to the signal it would have measured if the radar transmitter's local clock were synchronized with the global reference clock. Similarly, if a radar receiver clock is running slow, i.e., its local clock reaches a certain time stamp at a certain time duration after of a global reference clock, then this radar receiver will measure a signal that that has local time stamps advanced by the same time duration, compared to the signal it would have measured if the radar transmitter's local clock were synchronized with the global reference clock.

Moreover, some embodiments rely on the realization that the timestamps of the measurements at a receiver are shifted according to both the clock error of the transmitter that transmitted the pulse that was reflected and received by the receiver and the clock error of this receiver. For example, if the radar transmitter clock is running slow by a certain time duration and the radar receiver clock is running fast by a different time duration, then the radar receiver will measure a signal that has local time stamps delayed by the sum of the two different time durations, compared to the signal it would have measured if both transmitter and receiver local clocks were synchronized with the global reference clock. Thus, for each radar transmitter-receiver pair it is sufficient to determine the relative shift corresponding to the errors in their clocks. By determining only the relative shift for each radar transmitter-receiver pair, instead of the shift for each radar transmitter and receiver separately, it is possible to decouple the problem for each set of measurements, because only a single relative shift is affecting each set of measurements, instead of two, and this relative shift only affects the measurements corresponding to a single radar transmitter-receiver pair. This decoupling enables the formulation of a convex problem that can be solved efficiently.

Some embodiments are based on realization that the radar synchronization problem of recovering the correct radar image from incorrect measurements caused by the incorrect radar operator can be reformulated as recovering an incorrect radar image from correct measurements and correct radar operator. On one hand, such a reformulation does not make sense. However, some embodiments realize that the incorrect measurements determined via such a formulation of the radar synchronization problem can relate to the correct radar measurements through a time shift of the measurements, where the time shift is determined by the mismatch between the unsynchronized clocks of each antenna. Further, some embodiments realize that a time shift can be expressed as a convolution with a shift kernel. Each measurement from the same transmitting-receiving antenna pair is shifted using the same linear shift kernel since the clock mismatch is the same. Of course, measurements from different transmitter-receiver antenna pairs correspond to different shifts of the correct measurements, but, still, the present disclosure formulation can significantly reduce the number of unknowns in the radar synchronization problem allowing to use different techniques to solve this problem in an efficient manner.

For example, some embodiments, instead of trying to fix the measurements of the antennas, use those measurements to simultaneously find a shift of the measurements and a single radar image, such that, for each transmitter-receiver pair, when the measurements generated by the radar image are shifted with the corresponding shift fit the measurements of the receiver.

In addition, some embodiments are based on the realization that shifting the measurements generated by a radar image and comparing them to the measurements of the receiver is equivalent to inversely shifting the measurements of the receiver and comparing them to unshifted measurements generated by a radar image. For example, delaying the measurements generated by a radar image by a certain time duration and comparing if the delayed measurements fit the measurements of the receiver is equivalent to comparing the measurements generated by a radar image without delay, and comparing if that measurements fit the measurements of the receiver advanced by the same time duration. Similarly, advancing the measurements generated by a radar image by a certain time duration and comparing if they fit the measurements of the receiver is equivalent to comparing the measurements generated by a radar image without advance, and comparing if they fit the measurements of the receiver delayed by the same time duration.

Further, some embodiments are based on recognition that the shifts and the radar image can be found simultaneously using convex optimization. For example, one embodiment determines the set of shifts and the radar image iteratively using convex optimization, until a termination condition is met. For example, the embodiment updates the radar image and the shift kernels at the same time to reduce a convex cost function, which is a function of the radar image and the shift kernels.

Additionally, or alternatively, some embodiments are based on the realization that a shift kernel can be represented as a sparse signal in the time domain, i.e., as a signal that has very few non-zero coefficients. In some embodiments, the shift kernels are one-sparse, i.e., they only have one non-zero coefficient. For example, one embodiment determines sets of shift kernels that are sparse or one-sparse. This realization reduces the search space of unknowns and makes the problem easier to solve, even though it may be underdetermined.

Some embodiments are based on the realization that the radar image may be sparse. This is because the image may comprise of very few targets that reflect the radar waves. Other embodiments are based on the realization that the radar image may have low total variation. This is because some of the targets comprising the image may be extended instead of point targets. For example, one embodiment determines a radar image that is sparse. Another embodiment determines a radar image that has low total variation. A third embodiment determines an image that is both sparse and has low total variation. These realizations further reduce the search space of unknowns and make the problem easier to solve, even though it may be underdetermined.

Other embodiments are based on the realization that a solution that is sparse or has low total variation can be determined using regularization. Regularization promotes desired solutions and penalizes undesired ones, resulting to a smaller solution search space and allows for a solution to be determined even if the original problem itself is underdetermined. For example, some embodiments may use Lasso, i.e., sparse regularization, to determine a sparse solution by including a one norm of the solution. Some embodiments may use total variation (TV) regularization. Yet some other embodiments may use a fused Lasso regularization, which comprises of both Lasso regularization and TV regularization.

FIG. 1A shows a block diagram of a radar system 100 in accordance with some embodiments. The radar system 100 can have a number of interfaces connecting the system 100 with other systems and devices. A network interface controller 150 is adapted to connect the system 100 through the bus 106 to a network 190 connecting the radar system 100 with sensing devices. For example, the radar system 100 includes a transmitter interface 160 configured to command to a transmitter 165 to emit a radar pulse. Using a receiver interface 180 connected to a receiver 185, the system 100 can receive the reflections of the scene corresponding to the transmitted pulse. In some implementations, the radar system 100 receives the radar measurements 195, which are the measurements of reflections of a radar pulse transmitted to the scene through the network 190, The radar system 100 includes an output interface 170 configured to render the reconstructed radar image 128. For example, the output interface 170 can display the reconstructed image 128 on a display device, store the image into storage medium and/or transmit the image over the network. For example, the system 100 can be linked through the bus 106 to a display interface adapted to connect the system 100 to a display device, such as a computer monitor, camera, television, projector, or mobile device, among others. The system 100 can also be connected to an application interface adapted to connect the system to equipment for performing various tasks.

In some implementations, the radar system 100 includes an input interface to receive the radar measurements of a scene collected from a set of antennas with clock ambiguities. Examples of the input interface include a network interface controller (NIC) 150, the receiver interface 180, and a human machine interface 110a. The human machine interface 110a within the system 100 connects the system to a keyboard 111a and pointing device 112a, wherein the pointing device 112a can include a mouse, trackball, touchpad, joy stick, pointing stick, stylus, or touchscreen, among others.

The system 100 includes a processor 120a configured to execute stored instructions 130, as well as a memory 140 that stores instructions that are executable by the processor. The processor 120a can be a single core processor, a multi-core processor, a computing cluster, or any number of other configurations. The memory 140 can include random access memory (RAM), read only memory (ROM), flash memory, or any other suitable memory systems. The processor 120a can be connected through the bus 106 to one or more input and output devices.

The instructions 130 can implement a method for convex sparse recovery problem to produce a radar image 128 of the scene. To that end, the instruction includes convex sparse recovery problem solver 145 configured to solve a convex sparse recovery problem to produce a radar image of the scene. As defined herein, the convex sparse recovery problem matches a time shift of the radar measurements with a signal generated by propagation of the radar pulse through a radar propagation function of the scene. The time shift of the radar measurements is represented as a convolution of the radar measurements with a shift kernel that is one-sparse in time. In effect, the convex sparse recovery problem allows to transform non-convex ill-posed radar image recovery problem in the convex well-posed problem, which reduces computational requirements of the processor 120a.

To solve the convex sparse recovery problem, the radar system 100 stores additional information and/or modules to formulate the problem in advantageous and/or solvable manner. For example, the instructions 130 can store data indicative of propagation of the radar pulse 150. The data 150 is indicative of physics of hardware implementation of receivers and transmitters for determining radar measurements. The data 150 captures laws of propagation of emitted radar pulse in the environment as a radar propagation function of the scene. In some embodiments, the data 150 is stored as a forward operator A reflecting such a propagation. Different configuration of the radar system may have different values in the forward operator A.

Additionally, or alternatively, the instructions 130 can store a convex sparse recovery problem formulator 135 configured to formulate the sparse recovery problem using the radar data 150 and the radar measurements 195. For example, the formulator 135 can transform the received radar measurements in a Furrier domain, transform the convex sparse recovery problem in a matrix form to simplify the solution, and select and impose various constraints and regularizers on the solution to the convex sparse recovery problem.

Figure 1B:
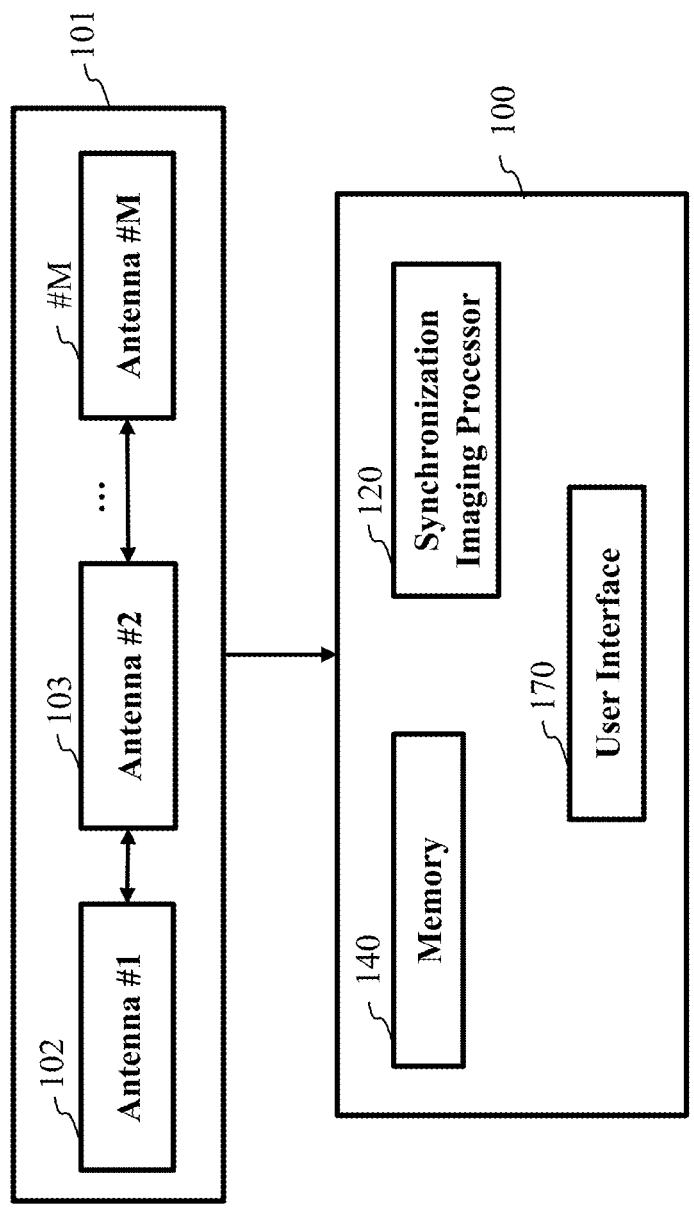
FIG. 1B is a block diagram of a cooperation between the radar system of FIG. 1A and a set of antennas with clock ambiguities configured to collect radar measurements of a scene according to some embodiments.

FIG. 1B is a block diagram of a cooperation between the radar system of FIG. 1A and a set of antennas 101 with clock ambiguities configured to collect radar measurements of a scene according to some embodiments. The set of antennas 101 can be unsynchronized and can store collected data in a memory 140 that is processed by a synchronization and imaging processor 120a of the radar system 100. The processor 140 can perform the system and method to produce a high-resolution radar image. The imaging result 128 can be shown through output interface 170.

In some embodiments, that radar image recovery begins with transmitting, using one or multiple antennas 101, radar pulses to a region of interest (ROI) and measuring, using a set of antennas at different positions, a set of reflections from the ROI corresponding to the transmitted radar pulses. Each antenna measures reflections of the ROI measurements specific to the antenna. The set of radar reflections can correspond to a transmitted signal from a transmitter directed toward the ROI or from some of the antennas in the set of antennas. The set of radar reflections or reflections can be stored in a memory of processor for each receiver and communicated to a central controller for processing.

In some embodiments, the processor determines an estimate of the radar image and measurement time shifts, by matching the reflections of the ROI measurements of each antenna from the set of antennas by minimizing a difference between measured radar reflections shifted according to the estimated time shifts, and a set of modeled measurements synthesized from the transmitted pulses and the estimate of the radar image.

Each antenna has a local clock that is approximately synchronized to each other and to a global, commonly accepted, clock. The global clock may be the actual clock of one of the antennas, the clock of a different reference system, such as a GPS satellite, a data aggregation and processing system, or some other system. Alternatively, a global clock may be notional, i.e., not physically tracked by some system. For example, it might be the implied clock that makes the average time shift of some or all sets of measurements to be zero, or the clock implied to make the average synchronization error equal to zero, or the clock implied by the time a command center transmits a signal to begin operation of the system.

In many embodiments, local clocks are maintained by local oscillators, such as quartz oscillators or atomic clocks. These clocks are used to trigger transmissions of signals at the correct instance and to time-stamp, i.e., index in time, the received measurements. Even if these clocks are very precisely synchronized initially, they exhibit different clock drifts due to temperature variations, material imperfections, environmental factors, or other reasons, which makes the clocks lose synchronization over time. While maintaining coarse synchronization of these clocks is possible, exact synchronization to the accuracy required for most distributed radar system applications is very difficult and expensive, if at all possible.

In some embodiments the difficulty of synchronization may be an issue even if the system is simply distributed over multiple hardware components on the same platform, even if the components are physically connected and share the same oscillator generating the clock signal. In those cases, uncertainty in the clock distribution circuits over the several hardware components may cause clock errors between the separate hardware components, despite the existence of a common clock-generating oscillator.

If the clock errors for each radar transmitter and receiver, or their relative clock shifts, are known when the received signals are processed, then the measurements can be processed to compensate for the clock error, and a radar image can be recovered. If the clock errors are compensated for, the measured radar reflections are properly aligned to produce a focused radar image, i.e., a radar image that is sharp and does not exhibit ambiguities. Embodiments of this invention simultaneously determine the relative clock errors, to correct the measurements, and a radar image that is consistent with the corrected measurements. In order to determine the correct solution, the reconstruction determines the relative timing corrections that produce the sharpest image consistent with the corrected measurements.

The radar transmitters and receivers may be stationary or moving along a pre-designed trajectory, and the effective position of each radar receiver where pulse reflections are received forms a virtual array. Even with perfect clock synchronization, the sharpness and the ambiguities in the image depend on the size of the virtual array and the wavelength of the transmitted pulse.

In some implementations, the convex sparse recover problem is solved by iteratively updating the estimate of the radar image and the time shifts, based on the determined set of measurement time shifts and the radar image, until the measurements generated by the estimate of the radar image sufficiently match the time-shifted measurements by each receiver antenna for each transmitter-receiver pair.

In this iterative process the sufficiency of the match is measured by computing an error between the measurements generated by the estimate of the radar image and the time-shifted measurements. Even when, ideally, the clocks are perfectly synchronized and the image estimate is exactly identical to the actual radar image, the radar measurements will not match exactly because of noise inherent in the acquisition process. Furthermore, it is well understood in the art that the image estimate cannot be a perfect match but a blurred version of the image because of resolution limitations due to the virtual array size. Thus, in some embodiments the iterative process may stop once the error drops below a maximum tolerable error. In some embodiments, the iterative process may stop when the error stops improving in each iteration. In some embodiments the iterative process may stop after some pre-determined number of iterations, thus reducing the computational cost of the algorithm.

Figure 1C:
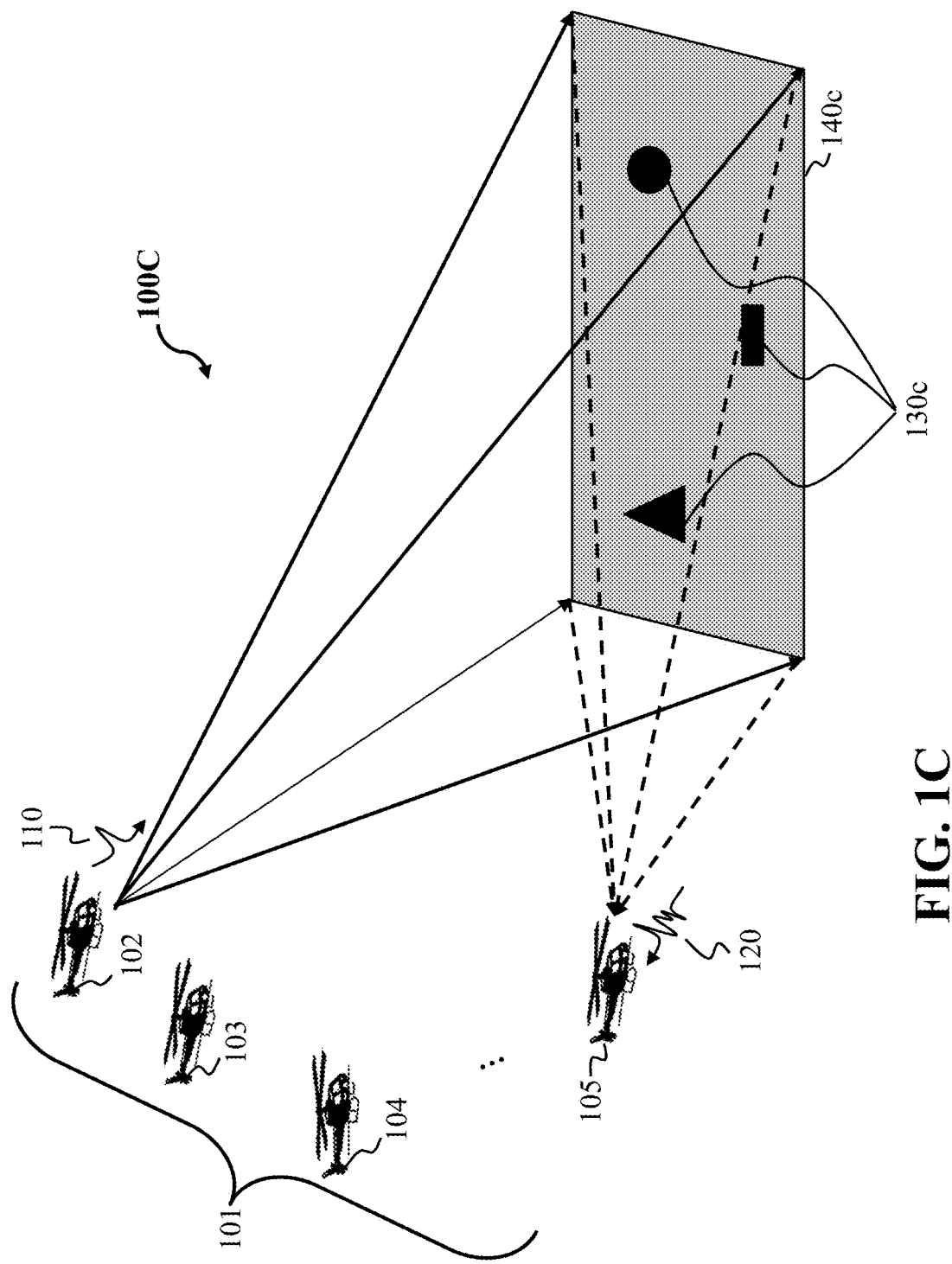
FIG. 1C is a schematic illustrating at least one system and method having distributed arrays of moving radar antennas for detecting targets in a region of interest (ROI) according to some embodiments.

FIG. 1C is a schematic illustrating at least one system and method 100C having distributed arrays of moving radar antennas 101 for detecting targets 130c in a region of interest (ROI) 140c, according to some embodiments. In particular, the system and method 100C, can be an airborne platform or vehicle mounted platform, etc, that includes at least one transmit/receive platform or transmitter/receiver 102, that can be moving or stationary and a set of M distributed moving similar receiver platforms or receivers 103, 104, 105 that can also be moving or stationary. It is contemplated that the set of M distributed receivers may be one or more, 10 or more or 20 or more. Radar pulses 110 are transmitted from at least one transmitter 102, which may also be a receiver, to illuminate targets 130c situated in an area of interest or region of interest (ROI) 140c, and the corresponding reflected radar reflections 120c are recorded by the multiple distributed receivers 102, 103, 104 and 105. The reflections 120c can be characterized as a weighted combination of delayed pulses, where complex weights depend on specific target reflectivities and antenna patterns. Given the pulses and reflections, radar images can be generated in a range-azimuth plane or the range-azimuth-elevation volume according to corresponding weights and delays. The azimuth and elevation resolutions of the radar images depend on the sizes of array apertures, and a range resolution depends on a bandwidth of the pulses.

Figure 1D:
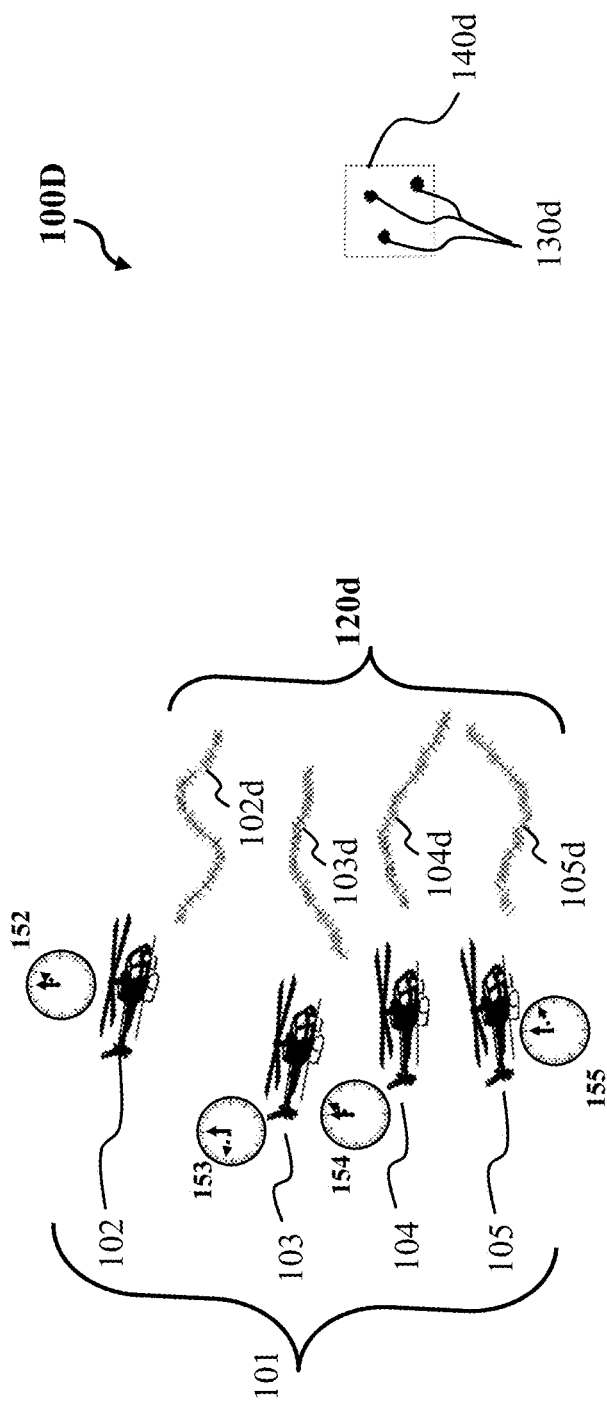
FIG. 1D is a schematic illustrating a time shift in a distributed moving radar imaging system according to some embodiments.

FIG. 1D is a schematic illustrating a time shift in a distributed moving radar imaging system 100D showing the emitted radar pulses emitted toward the ROI, according to some embodiments. The radar receivers are receiving radar pulse reflections 102d, 103d, 104d, 105d, that form the virtual array 120d. The radar pulse reflections are from emitted radar pulses from a transmitter toward the scene 140d and reflected from the scene toward the receivers to form the virtual array 120d of receivers. The distributed arrays of moving radar platforms 101 includes at least one radar platform having an antenna cell which is connected to a radar transmitter 102 that generates the radar pulses toward the scene. As noted above, the radar transmitter 102 is combined with a receiver 102. The radar receivers 102, 103, 104, 105 acquire reflections reflected by targets 130d in the area of interest (ROI) of the scene 140d.

In some embodiments, the radar receivers 102, 103, 104, 105 each have a local clock 152, 153, 154 155, which may be fast or slow relative to a global clock. The local clocks are used to timestamp the received reflections. For example, in some embodiments, the time stamping might be using an absolute time. In some other embodiments, the time stamping could be relative to one or more commonly agreed start times, usually referred to as zero. In some other embodiments, time stamping might be implicit, for example by the sequence of recorded samples of the signal, at regular intervals, relative to the starting time of the recording.

A fundamental challenge that arises in distributed array imaging comes from uncertainty in the clock of the antennas. Advanced positioning and navigation systems, such as the global navigation satellite system (GPS/GNSS) and the inertial navigation system (INS) provide somewhat accurate timing information, and timing and synchronization algorithms can further improve the accuracy with reasonable cost. However, the remaining uncertainty in the true clock error can be significant, compared to the operating frequency of the transmitting and receiving antennas. As a result, the received signal contains a gain and phase ambiguity when the inexact clock timing is used as reference. Consequently, applying standard reconstruction techniques without accounting for the timing perturbation produces out-of-focus radar images.

Contrary to modeling the timing error as a phase error in the frequency domain and correcting it before reconstructing the radar image, various embodiments model the timing error as a convolution with a shift kernel representing the compensation, i.e., a signal which is one-sparse. A sparse signal is such that most of its coefficients are zero and very few are non-zero. A one-sparse signal, in particular, is such that only one of its coefficients is non-zero and all the remaining ones are equal to zero. A shift kernel is a one-sparse signal with the non-zero coefficient located at the time instance of the time delay or the advance that the kernel implements.

Figure 1E:
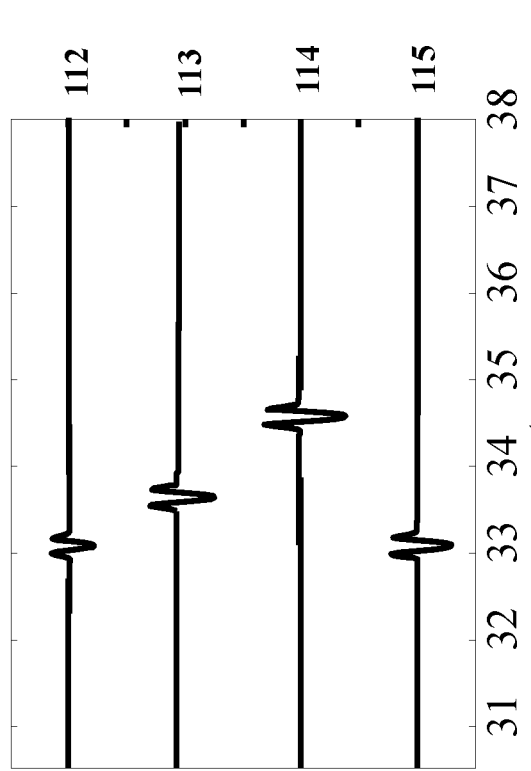
FIG. 1E and FIG. 1F are schematics that illustrate distortion that affects the measured time domain signal of each antenna due to the error in each radar clock according to some embodiments.
Figure 1F:
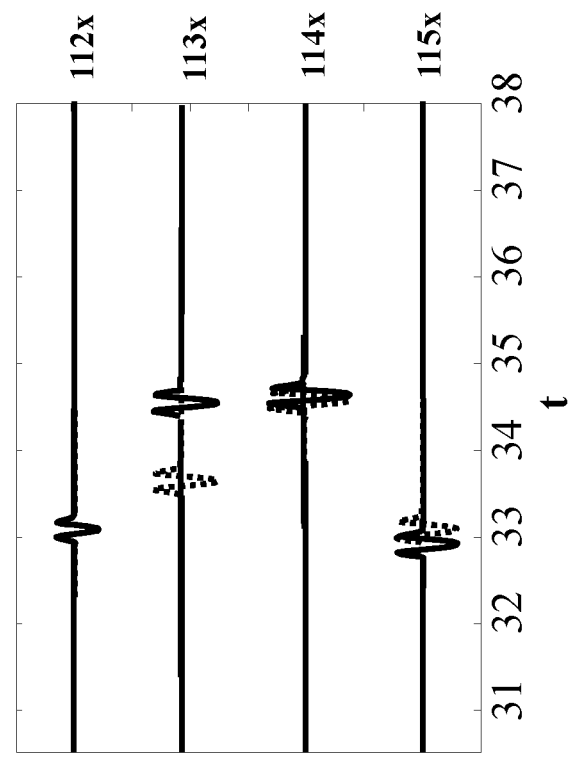

FIG. 1E and FIG. 1F are schematics, when viewed together, illustrate distortion that affects the measured time domain signal of each antenna due to the error in each radar clock, when measuring the reflection of a single target, according to some embodiments. Further, FIG. 1E are schematics of the ideal case that all radar clocks are perfectly synchronized. A distributed array 101 is shown comprised of a transmitter/receiver platform 102 and receiver-only platforms 103, 104, 105. The transmitter antenna transmits a pulse 110 to the scene which contains a single reflective target 130. The pulse is reflected by the reflective target and its reflection 120 is acquired by all the receiving antennas in all the receiving platforms 102, 103, 104, 105. The antennas 102-105 form a distributed array of antennas 101. If the clocks of all transmitters and receivers are perfectly synchronized, according to the global time $t_0$, the signals 112, 113, 114, 115 received by each antenna 102, 103, 104, 105 comprise of the pulse delayed and scaled according to the round-trip distance of the transmitter antenna to the single reflector and back to each receiver.

FIG. 1F is a schematic illustrating the mapping between a set of antennas exhibiting clock errors and measuring the reflection of a single target to a set of antennas having synchronized clocks and measuring shifted versions of the same target from FIG. 1E, according to embodiments of the present disclosure. Further, FIG. 1F is a schematic of the signal model in the radar measurements 195 of FIG. 1A that the measured reflections of a single target with erroneous clocks is equivalent to time-shifting measurements of the same target with clock synchronized to the global time.

FIG. 1F demonstrates the effect of clock errors in the acquired data, by showing how the signals are recorded and time stamped 112x, 113x, 114x, 115x, by the local time of each receiver. The local clocks of each system are 152, 153, 154, 155, where a solid line shows the local time, compared to the global time in a dashed line. In the example in the figure, some clocks might run slow, 152, 154, i.e., show time 0 when the global time is past zero, or fast 153, 155, i.e., show time 0 when global time has not reached zero yet. Depending on the time shift, the corresponding signals might be time shifted to appear earlier or later (solid lines) compared to how the signals would have been recorder if all the clocks have been synchronized (dotted lines).

In this example, the transmitter/receiver clock 152 runs slow. Thus, the transmitted pulse 110 is delayed by the clock error and its reflections arrive delayed to the receiver. The receiver antenna of the transmitter/receiver platform 102 exhibits the same clock error, which advances the signal in the local time t and, thus, cancels out the delay of the transmission for this recorder signal 112x. On the other hand, the clock 153 of receiver 103 runs fast in this example. Thus, the recorder signal 113x is delayed by the cumulative error of the two clocks, compared to the signal 113 that would have been recorded if all platforms where synchronized to the global clock. Similarly, the clock 154 of receiver 104 might run slow by an amount smaller that the error of the transmitter clock 152. Thus, the recorder signal 114x is delayed by the difference of the errors of the two clocks, compared to the signal 114 that would have been recorded if all platforms where synchronized to the global clock. Similarly, the clock 155 of receiver 105 might run fast by an amount larger that the error of the transmitter clock 152. Thus, the recorder signal 115x is advanced by the difference of error of the two clocks, compared to the signal 115 that would have been recorded if all platforms where synchronized to a global clock.

Figure 2A:
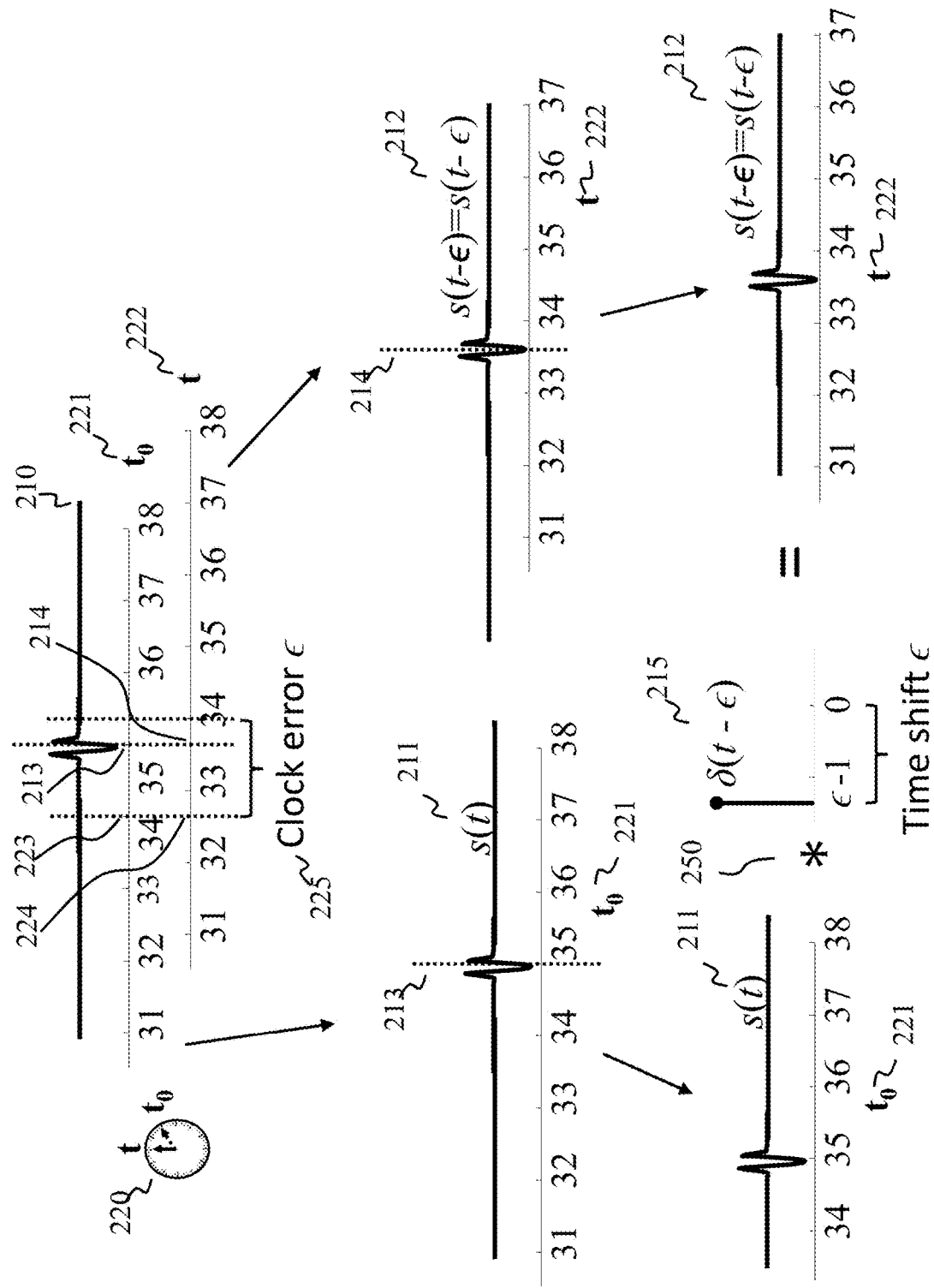
FIG. 2A is a schematic demonstrating an example of the effect of clock error to the time stamps of the recorded signal used by some embodiments.

FIG. 2A is a schematic demonstrating an example of the effect of clock error to the time stamps of the recorded signal used by some embodiments. In particular, a receiver has a local clock 220, which keeps a local time 222. The local clock exhibits an error $\epsilon$ 225 relative to the global time 221. In this example, the local clock is running slow, i.e., at any time instance, the local time is lower than the global time. In other words, when the global clock reaches a certain time mark 223, e.g., at 34 time units, the local clock has not reached it yet, e.g., has reached the time mark at 32.5 time units 224 and $\epsilon$ is a 1.5 time units advance. A typical convention in the art is that delays are represented as positive time shifts and advances as negative time shift, i.e., in this example $\epsilon$ =−4.5 time units.

Still referring to FIG. 2A, a signal 210 recorded and time stamped using the time marks of the local clock 212 will appear to have timestamps that are smaller compared to the same signal recorder and time stamped using the global clock 211. For example, the global time instance of the middle negative peak of the pulse in the FIG. 213, is 35, while the recording using the local clock time stamps the same negative peak at 33.5, 214. If the local clock is slow, then for the same point in the signal, the recorded time stamp is advanced by $\epsilon$ compared to the time stamp of the global clock. If the local clock is fast, then the recorder time stamp is delayed by $\epsilon$ compared to the time stamp of the global clock.

FIG. 2A further demonstrates by way of example that time shifts are equivalent to convolutions with a shift kernel and that a shift-kernel is a one-sparse signal. In particular, the ideal signal timestamped with the global clock 211 is advanced by time $\epsilon$ to produce the signal actually recorded and time stamped with the local clock 212. The time shift, as well-known in the art, can be represented using a convolution 250 with an impulse $\delta(t-\epsilon)$ 215, i.e., an impulse function centered at the time instance $\epsilon$. Since this impulse only has one non-zero coefficient, at time $\epsilon$, it is a one-sparse signal.

Some embodiments are based on recognition that representing a delay using a one-sparse signal expands the dimensionality of the representation. For example, using a discrete-time representation of the one-sparse signal with sampling interval $\Delta$ time units, to represent a maximum time shift of T time units requires a shift kernel of size $2T/\Delta+1$ instead of a single time parameter $\epsilon$. If an application requires estimation of a time delay, representing the time delay as a single value $\epsilon$ requires the estimation of a single parameter. Instead, representing the time delay using a shift kernel requires the estimation of $2T/\Delta+1$ parameters, i.e., requires a significantly larger problem. Furthermore, if the maximum uncertainty in the time shift increases, the size of the shift kernel-based representation increases proportionately in size, i.e., in number of parameters to be estimated, and requires more data to have sufficient information. For comparison, if the delay is represented as a single parameter, the problem size is constant, irrespective of the maximum uncertainty in the time shift. The constraint that the shift kernel is one-sparse may help in reducing the data requirements of the estimation problem, despite the higher dimensionality, but it does not eliminate the dependency on the maximum length, and does not reduce the computational or memory complexity of the estimation.

Figure 2B:
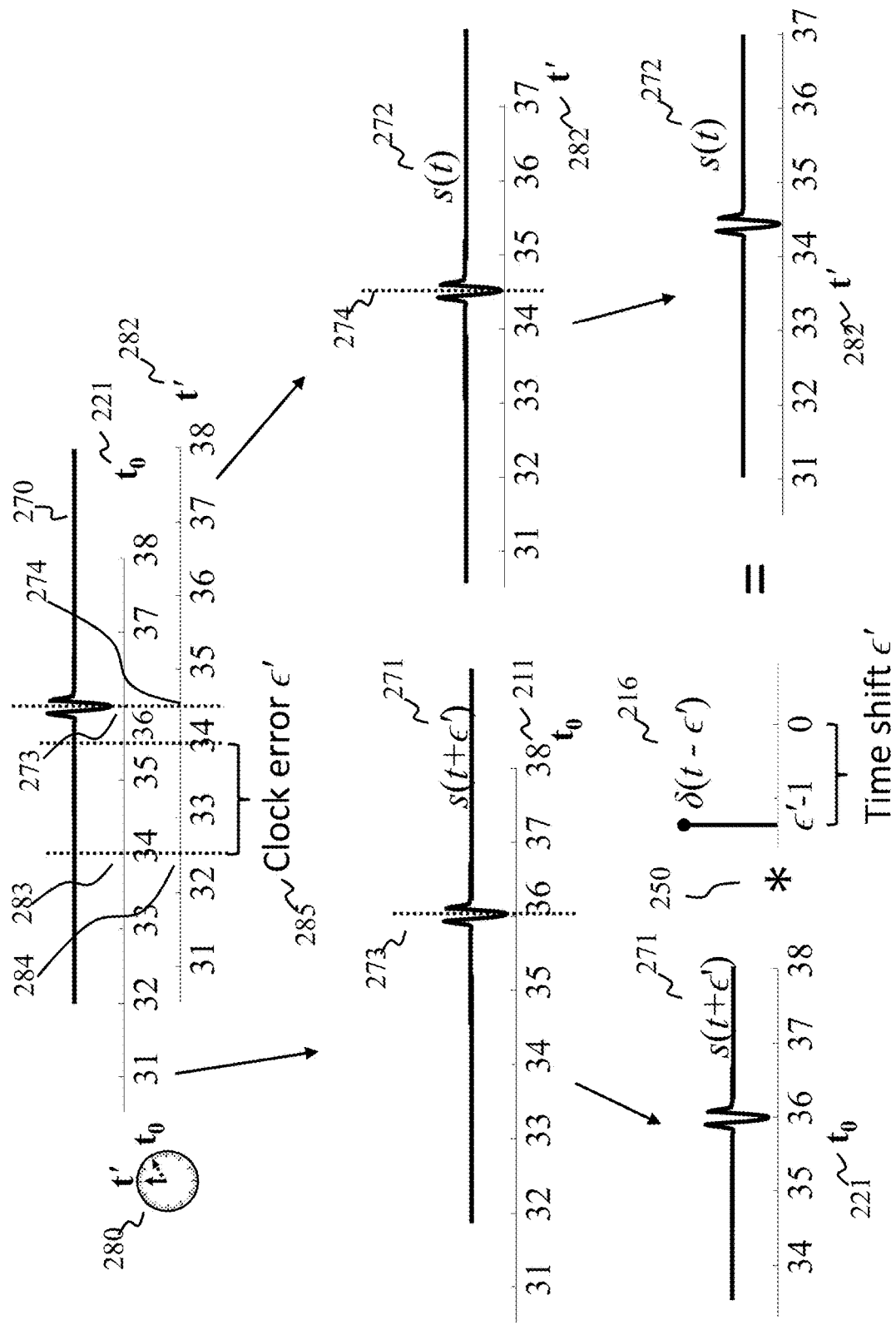
FIG. 2B is a schematic demonstrating another example of the effect of clock error to the time stamps of the transmitted signal according to another embodiment.

FIG. 2B is a schematic demonstrating another example of the effect of clock error to the time stamps of the transmitted signal according to another embodiment. In particular, a transmitter has a local clock 280, which keeps a local time 282. The local clock exhibits an error $\epsilon$ ' 285 relative to the global time 221. In this example, the local clock is running slow, i.e., at any time instance, the local time is lower than the global time. In other words, when the global clock reaches a certain time mark 283, e.g., at 34 time units, the local clock has not reached it yet, e.g., has reached the time mark at 32.5 time units 284 and $\epsilon$ ' is a 1.5 time units advance, i.e., similarly to the example above, in this example $\epsilon$ '=−1.5 time units.

Still referring to FIG. 2B, a signal, such as a pulse, 270 transmitted with timing managed by the local clock 282 will appear to have been transmitted later, i.e., to have been delayed, with respect to the global clock. For example, the transmitter may time the transmission of a signal such that the middle negative peak of a pulse occurs at time 34.5 in the local clock 274. In this case, because of the local clock error, the signal transmitted will have the middle negative peak of a pulse occur at time 36 in the global clock 273. Thus, the transmitted signal with respect to the global clock 271 is time advanced by $\epsilon$ ' compared to the transmitted signal with respect to the local clock 272. Since in this example $\epsilon$ ' is negative, a time advance by $\epsilon$ ' is in fact a delay by −$\epsilon$ '=1.5 time units. As already described, this time shift can be represented as a convolution 250 with a shift kernel 216. Since the transmitted signal with respect to the global clock 271 is time advanced by $\epsilon$ ' compared to the transmitted signal with respect to the local clock 272, the shift kernel corresponds to a delay by $\epsilon$ '.

If the local clock, instead, is running fast, then the signal transmitted would be advanced with respect to the global clock compared to the signal with respect to the transmitter's local clock.

Figure 2C:
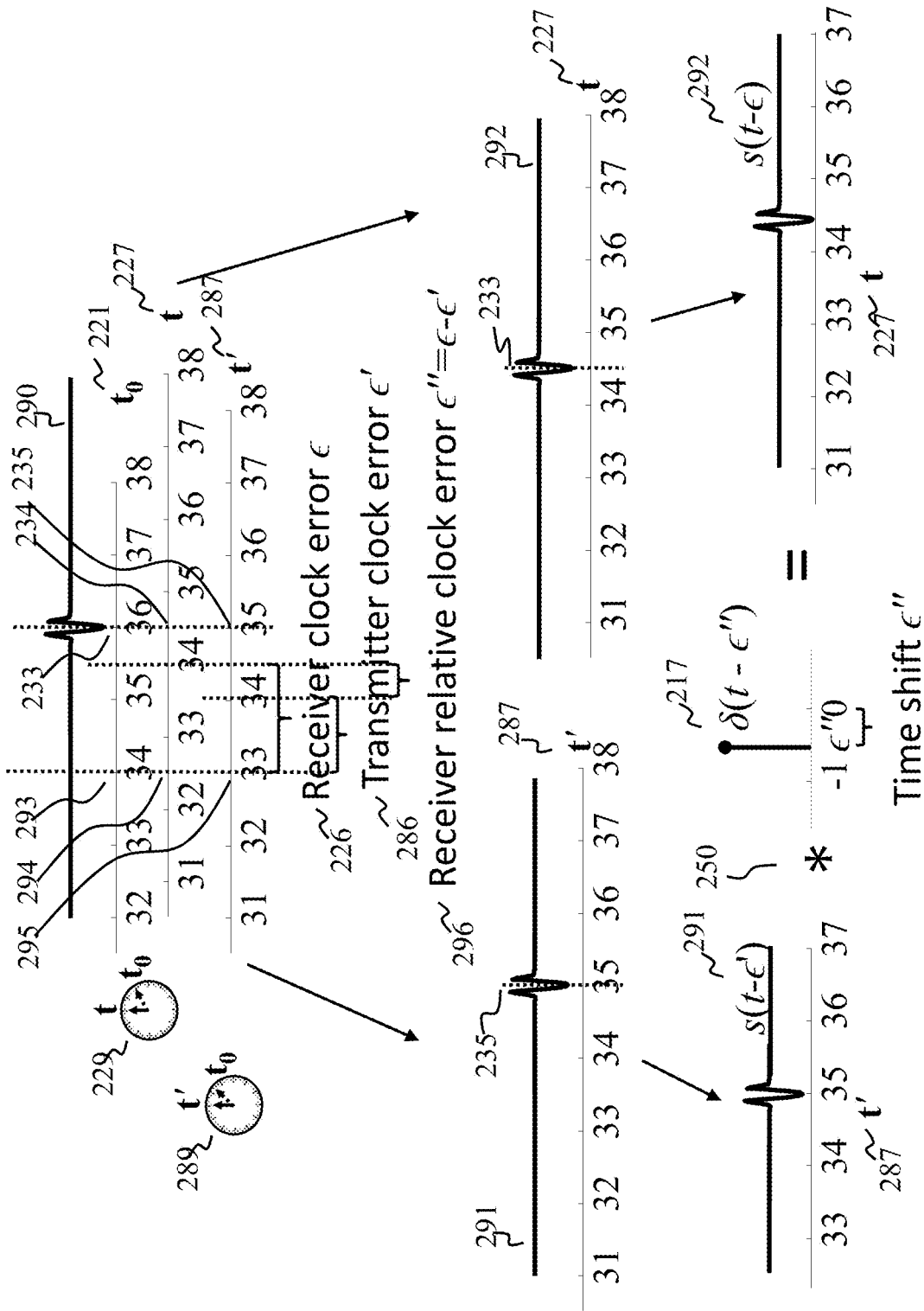
FIG. 2C is a schematic demonstrating an example of the effect of clock errors at both a transmitter and a receiver local clock according to some embodiments.

FIG. 2C is a schematic demonstrating an example of the effect of clock errors at both a transmitter and a receiver local clock according to some embodiments with respect to the signal measured by a receiver and timestamped according to the receivers' local clock, when the signal is a reflection by the scene of a transmitted signal which is transmitted by a transmitter according to its local clock. In particular, a transmitter has a local clock 289, which keeps a local time 287. The local transmitter clock exhibits an error $\epsilon$ ' 286 relative to the global time 221. A receiver has a local clock 229, which keeps a local time 227. The local receiver clock exhibits an error $\epsilon$ 226 relative to the global time 221.

In this example both the transmitter local clock and the receiver local clock are slow with respect to the global clock 295, albeit with different errors. For example, the receiver time 227 might be slow by 1.5 time units relative to the global time 211, while the transmitter time 287 might be slow by 1 time unit. In other words, the receiver clock 225 is slow relative to the transmitter clock 285 by 0.5 units, i.e., has a relative clock error 296 equal to $\epsilon$ "=$\epsilon$ −$\epsilon$ '=−.5 time units.

Still referring to the example in FIG. 2C, a signal, such as a pulse, 290 transmitted by the transmitter with timing managed by the transmitter's local clock 289 will appear to have been transmitted later, i.e., to have been delayed, with respect to the receiver's local clock 229. For example, the transmitter may time the transmission of a signal such that the middle negative peak of a pulse occurs at time 35 in the transmitter's local clock 235. In this case, because of the relative clock error, the signal transmitted will have the middle negative peak of a pulse occur at time 34.5 in the receiver's local clock 233. Thus, the transmitted signal with respect to the receiver's local clock 292 is time delayed by $\epsilon$ " compared to the transmitted signal with respect to the transmitter's local clock 291. Since in this example $\epsilon$ " is negative, a time delay by $\epsilon$ " is in fact an advance by $\epsilon$ "=0.5 time units. As already described, this time shift can be represented as a convolution 250 with a shift kernel 217. Since the transmitted signal with respect to the transmitter's local clock 271 is time advanced by $\epsilon$ " compared to the transmitted signal with respect to the receiver's local clock 272, the shift kernel corresponds to a delay by $\epsilon$ '.

Still referring to FIG. 2C, for this particular transmitter-receiver pair in the example, the receiver receives reflections from the scene of the signal transmitted by the transmitter according to the transmitter's local clock. Since these reflections are triggered by the transmitter transmitting a signal, they are time shifted compared to the receiver's local clock by the same time shift that the transmitted signal exhibits compared to the receiver's local clock, i.e., $\epsilon$ ". Therefore, given the relative time error $\epsilon$ " of the transmitter and receiver clocks for a given transmitter-receiver pair, the receiver will receive a received signal time stamped by the receivers local clock that is time delayed by $\epsilon$ " compared to an ideal signal that the receiver would have receive and time stamped if transmitter and receiver were perfectly synchronized.

Figure 3A:
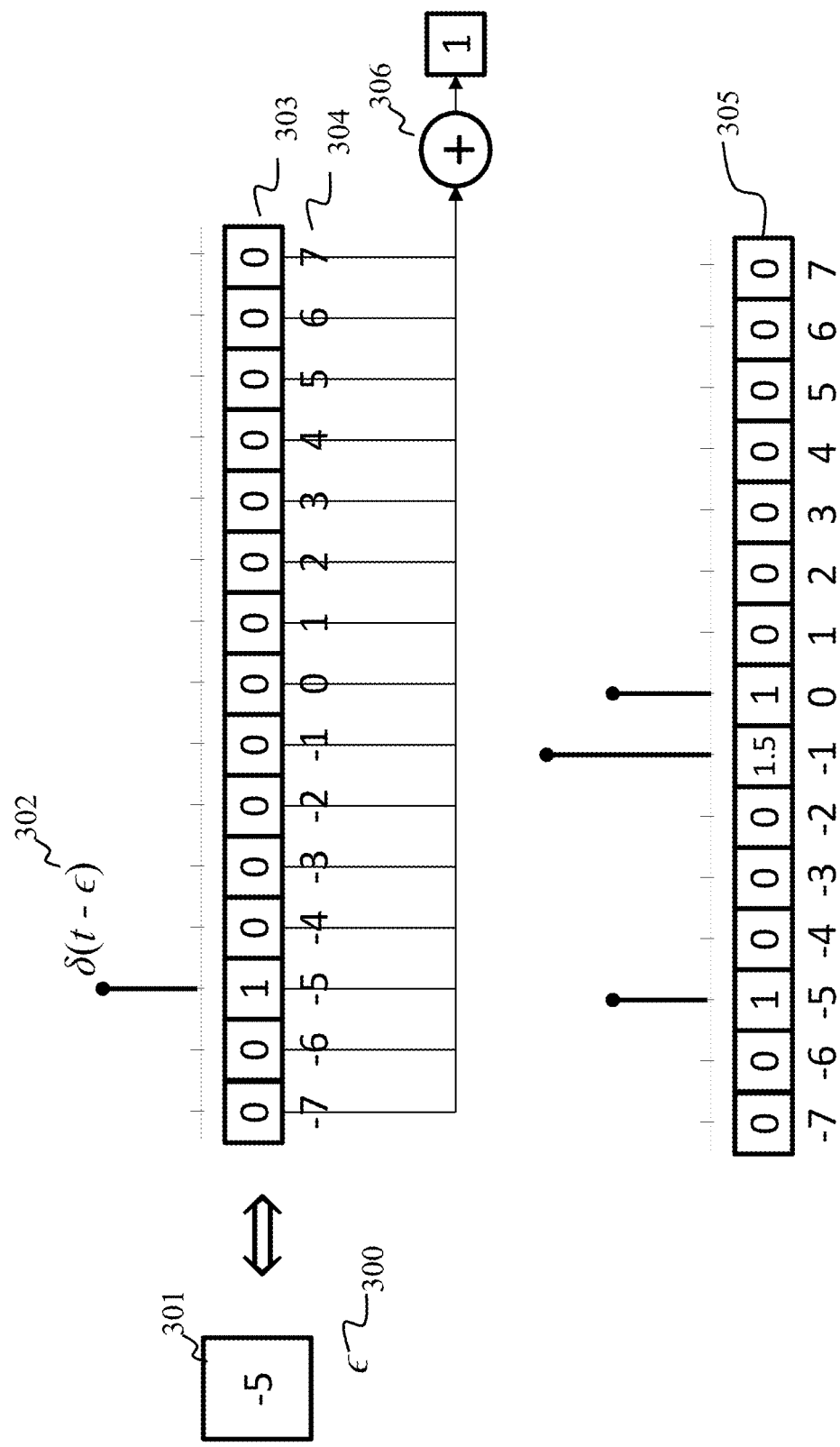
FIG. 3A is a schematic illustrating how a delay may be represented in a computer as a single coefficient or equivalently as a shift kernel in accordance with some embodiments.

FIG. 3A is a schematic illustrating how a delay may be represented in a computer as a single coefficient 300 or equivalently as a shift kernel 302 in accordance with some embodiments. Representing the delay as a single coefficient uses a single memory cell 301. On the other hand, representing the delay as a shift kernel requires a sequence of coefficients, for example stored in a bank of memory cells 303, indexed by a time stamp 304 of each coefficient, which might be explicit or implicit, relative to a zero time, where the indices may correspond to time units of certain duration. Each coefficient in the representation is the value of the shift kernel at the corresponding time index. For example, in the figure, the kernel is equal to zero for all time indices except the index −5, where the kernel is equal to 1. This kernel is equivalent to a delay of −5 time units.

A sequence of coefficients used to represent a shift kernel may also be used to represent other signals, i.e., general convolution kernels, e.g., 305. However, these convolution kernels may not be delays if they are not one-sparse. A one-sparse convolution kernel is one whose representation comprises of coefficients that are all zero except for a single coefficient which has non-zero value. A one-sparse convolution kernel represents a delay with a possible scaling according to the value of the non-zero coefficient. If the value is equal to one, then the convolution kernel is a simple delay with no scaling. A one-sparse convolution kernel with coefficient values that have sum 306 equal to 1 will necessarily have a single coefficient with value equal to 1, i.e., it will be a shift kernel.

Figure 3B:
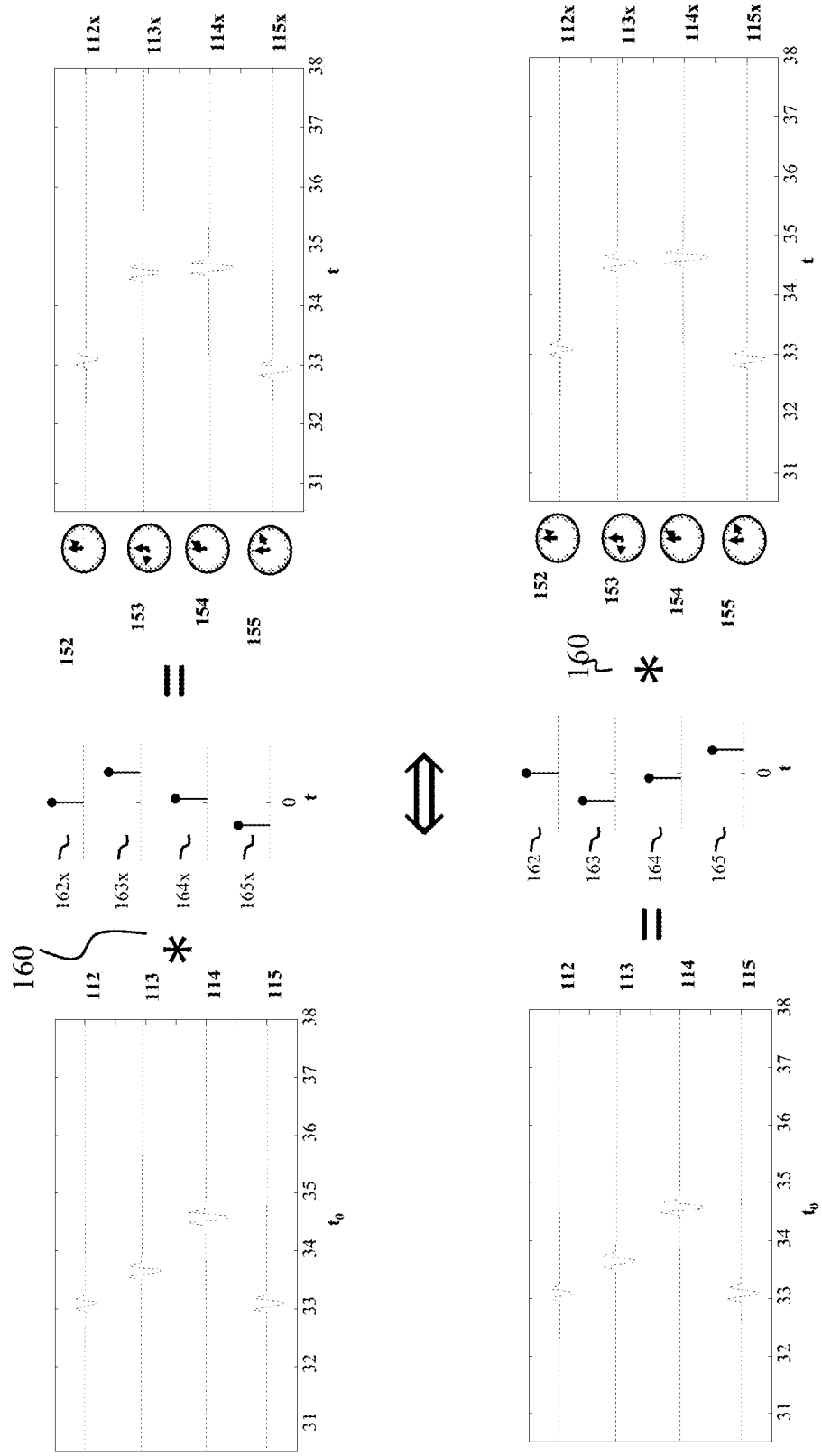
FIG. 3B is a schematic illustrating the relationship between the shifted recorded signals due to clock errors and the signals that would have been recorded if there we no clock errors used by some embodiments.

FIG. 3B is a schematic illustrating the relationship between the shifted recorded signals due to clock errors and the signals that would have been recorded if there we no clock errors used by some embodiments. The top of the figure demonstrates that the recorder signals 112x, 113x, 114x, 115x are equal to convolutions 160 with shift kernels 162x, 163x, 164x, 165x, corresponding to the effect of the clock error, of the signals that would have been recorded 112, 113, 114, 115 if all platforms were synchronized to a global clock. The equivalent operation is shown on the bottom of the figure, which demonstrates that the recorded signals, 112x, 113x, 114x, 115x, convolved 160 with shift kernels 162, 163, 164, 165, corresponding to corrections of the clock error, are equal to the signals that would have been recorded 112, 113, 114, 115 if all platforms were synchronized to a global clock.

In such a manner, finding a time shift of an unknown ideal signal is converted to finding a time shift of the radar measurements that would match an unknown ideal signal. As can be seen from the bottom of FIG. 3B, such a problem transformation allows to decouple the unknown time shift from the unknown scene that generates the unknown ideal signal, i.e., the unknown time shift and the unknown scene are on different sides of the equation. Thus, some embodiments find a time shift of the radar measurements that would match an unknown ideal signal instead of finding a time shift of an unknown ideal signal to match the measurements.

As shown in FIG. 3B, the unknown time shift, which is an unknown shift of the received signal in time, can be represented as a convolution with an unknown impulse 162x-165x. This is advantageous, because the convolution by the unknown impulse is a liner operation. In such a manner, the decoupling of the unknowns, combined with linearization gained from the convolutional representation result in a convex radar image recovery problem. However, even after convexification, this problem is still difficult to solve, because the resulting convex problem has a large number of parameters. Furthermore, when the delay is only represented as a convolution with an unknown kernel, the problem may have a large number of optimal solutions, while only one of them is the desired one.

Some embodiments are based on another realization that the unknown shift kernel can be represented as an unknown signal that is one-sparse in time. In effect, these realizations allow to transform the original non-convex image recovery problem into a convex sparse recovery problem, which in turn allows to use sparse reconstruction techniques to reduce the size of the solution space of the convex sparse recovery problem for estimating the radar image.

To that end, some embodiments recover a radar image 128 of a scene including sparse targets, and represented in vector form as $x \in C^N$. For example, the image is to be recovered by processing F-dimensional frequency-domain measurements $\{\tilde{y}_m\}_{m=1}^M$ 120 from M distributed antennas 101 that suffer from clock errors. The present disclosure has developed an image reconstruction framework, wherein clock errors result in a time shift of the measured data that corresponds to a time-domain convolution model, as illustrated above.

For example, for a transmitter-receiver pair m, if the transmitting antenna transmits pulse p(t) with respect to the global clock to the scene, then, at the receiver antenna, the received data with respect to the global clock is equal to $$r_m(t) = \sum_{n=1}^{N} x_n p(t) * a_m^n(t),$$

where $x_n$ is the reflectivity of scene point n, $r_m(t)$ the received data with respect to the global clock, and $a_m^n(t)$ is the impulse response of the channel that describes the propagation of the reflected pulse from the transmitter to the scene point n and back to the receiver as a function of time t, for the transmitter/receiver pair m, and * denotes the convolution operation.

Given a relative clock delay of the transmitter relative to receiver $\epsilon_m$, then the received signal in the receiver's local clock is equal to $$y_m(t) = r_m(t) * \delta(t - \epsilon_m) = \left(\sum_{n=1}^{N} x_n p(t) * a_m^n(t)\right) * \delta(t - \epsilon_m),$$

where $y_m(t)$ is the received signal in the receiver's local clock and $\delta(t-\epsilon_m)$ is an impulse delayed by $\epsilon_m$.

As described in FIG. 3B, this means that the received signal in the receiver's clock, when shifted by the reverse delay $-\epsilon_m$, would be equal to the signal that would have been received if the transmitter and the receiver were synchronized, i.e., $$y_m(t) * \delta(t + \epsilon_m) = r_m(t) = \sum_{n=1}^{N} x_n p(t) * a_m^n(t).$$

Figure 4:
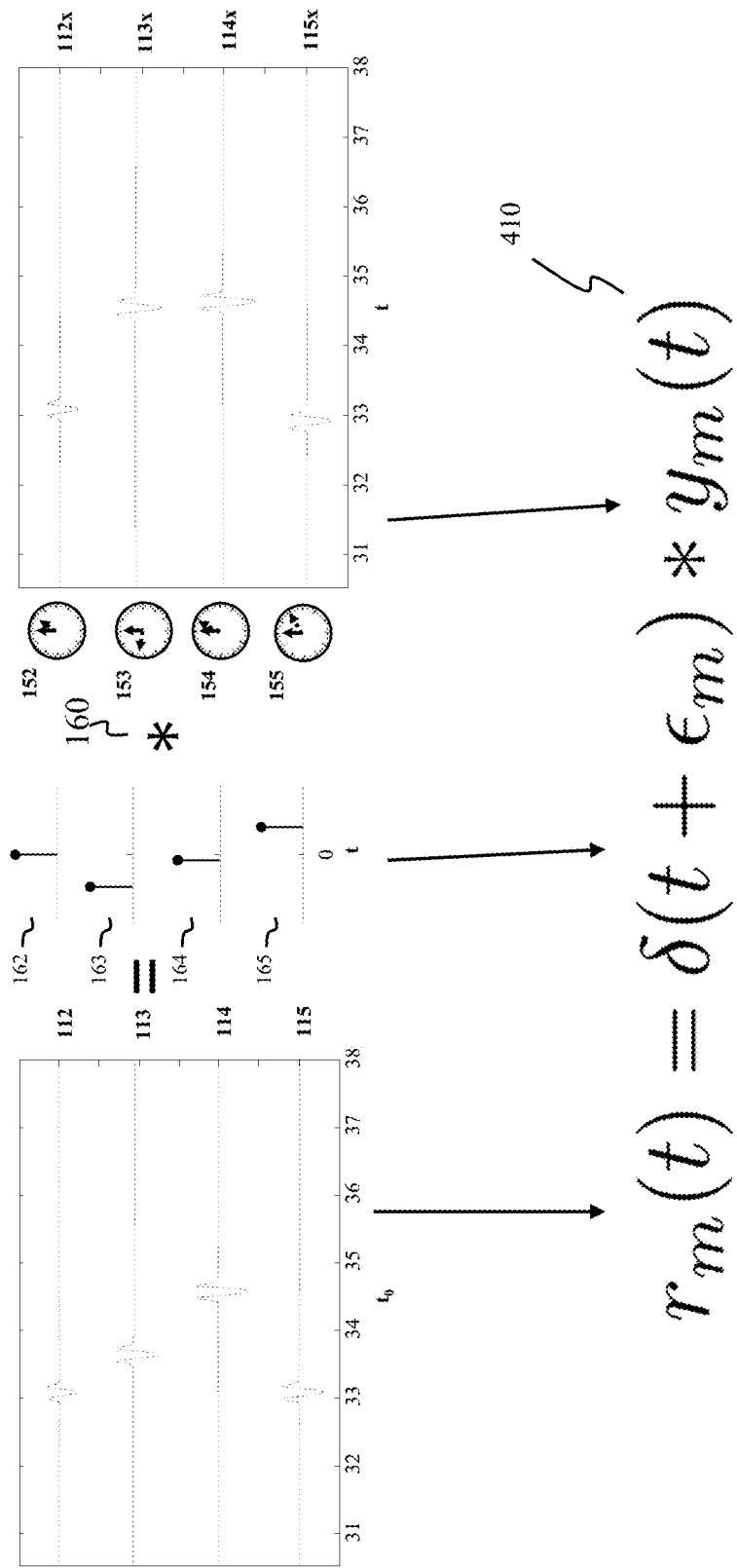
FIG. 4 shows a schematic of components of a convex sparse recovery problem used by some embodiments.

FIG. 4 shows a schematic of components of a convex sparse recovery problem used by some embodiments. Specifically, this figure demonstrates mathematical representations 410 of relationship between the shifted recorded signals due to clock errors and the signals that would have been recorded if there we no clock errors as described before, e.g., in relation to FIG. 3B. Note that $\delta(t+\epsilon_m)*y_m(t)=y_m(t)*\delta(t+\epsilon_m)$.

Figure 5:
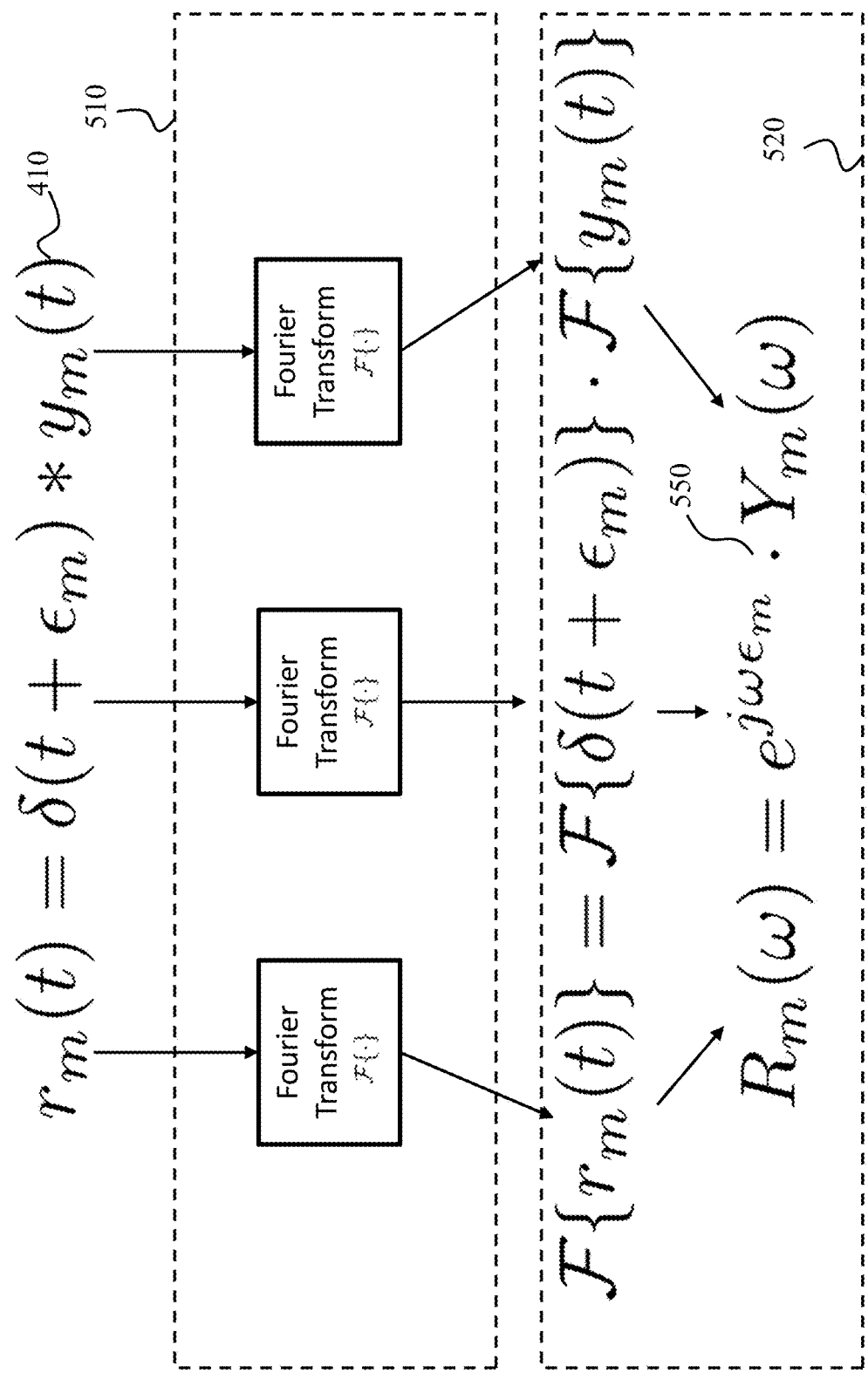
FIG. 5 shows a schematic of transformation of components of FIG. 4 into resulting frequency domain model according to some embodiments.

FIG. 5 shows a schematic of transformation of components of FIG. 4 into resulting frequency domain model according to some embodiments. For example, a time domain model of relationship 410 can be expressed in a frequency domain by taking a Fourier transform $\mathcal{F}\{\bullet\}$ 510. Using a Fourier transform, convolutions with a time delay or advance in a time domain model are converted to multiplications 550 with a complex exponential in a frequency-domain model, which reduce the complexity of computation. Thus, the resulting frequency domain model 520 is $$Y_m(\omega)e^{j\omega\epsilon_m} = R_m(\omega) = \sum_{n=1}^{N} P(\omega)A_m^n(\omega)x_n,$$

where $Y_m(\omega)$, $R_m(\omega)$, $P(\omega)$ and $A_m^n(\omega)$ are Fourier transforms of $y_m(t)$, $r_m(t)$, $p(t)$ and $a_m^n(t)$, respectively, and $\omega$ is a frequency in a frequency domain.

Figure 6A:
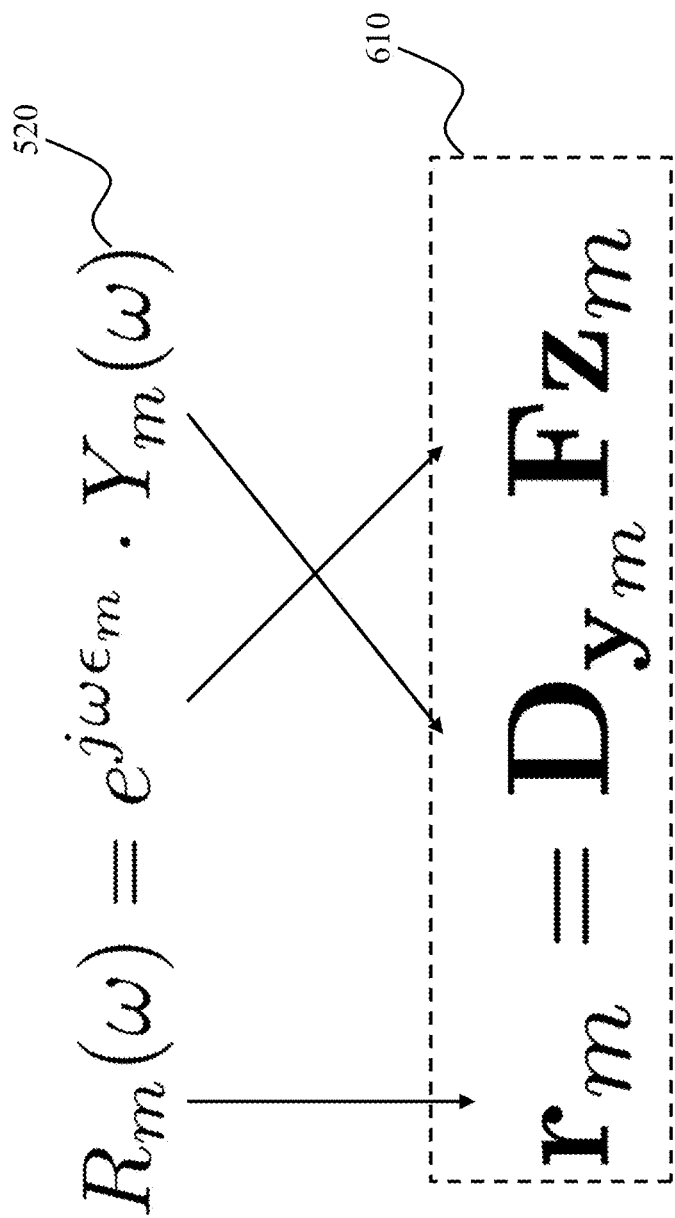
FIG. 6A shows a schematic of discretizing a resulting frequency domain model of FIG. 5 according to some embodiments.

FIG. 6A shows a schematic of discretizing a resulting frequency domain model of FIG. 5 according to some embodiments. In order for the frequency domain model 520 to be processed by a processor in some embodiments, the model 520 is discretized to time and frequency grids according to a sampling theorem, such as the Nyquist theorem or the Landau theorem. Such a discretization converts each of the Fourier transforms to operations 610 that can be performed in a computer, for example using a Fast Fourier Transform (FFT) or a matrix multiplication.

In particular, a discretized equivalent model is $r_m = A_m x$, where $r_m$ contains samples in frequency of $R_m(\omega)$, and the matrix $A_m$ incorporates, in frequency, the transmitted pulse $P(\omega)$ and the channel response $A_m^n(\omega)$. The matrix A is a forward operator defining the propagation of the pulse through the scene and back to the receivers. In other words, given in image of a scene x, the product $A_m x$ generates a signal $r_m$, which is a propagation of the radar pulse through a radar propagation function of the scene.

Using $Z_m(\omega) = e^{j\omega\epsilon_m}$ to denote the advance $z(t) = \delta(t + \epsilon_m)$ in the frequency domain, the discretized data in the receiver's clock satisfy $$D_{y_m} F z_m = A_m x,$$

which is equivalent to $$D_{y_m} F z_m - A_m x = 0,$$

where, $y_m$ is the frequency-domain received data, $z_m$ is the impulse response of the time domain advance, F is a Fourier transform matrix, $F z_m$ is a Fourier transform of $z_m$, i.e., the frequency-domain representation of the advance, $D_{y_m}$ is a diagonal operator with $y_m$ in the diagonal, and 0 is a vector with all zero coefficients. In other words, the discretization converts the element-wise multiplication 550 to a multiplication of the diagonal matrix $D_{y_m}$ with the vector $F z_m$.

To solve this equation in some embodiments it is convenient to use a matrix form $$[D_{y_m} F - A_m]\begin{bmatrix} z_m \\ x \end{bmatrix} = 0.$$

In some other embodiments, the matrix form $$[F - D_{y_m}^{-1} A_m]\begin{bmatrix} z_m \\ x \end{bmatrix} = 0$$

may be used. Even though the two forms are equivalent, the latter might be preferable in some cases because the resulting matrices exhibit more desirable conditioning properties. On the other hand, in the presence of noise the latter form might amplify the noise more, which might be less desirable. As a way of example, the rest of this disclosure uses the latter form, even though the former or other forms can be easily substituted in other embodiments.

In some embodiments, the data and clock delays from all transmitter-receiver pairs can be combined and represented in the following model:

$$\begin{bmatrix} \tilde{A}_1 & -F & \Theta & \Theta & \cdots & \Theta \\ \tilde{A}_2 & \Theta & -F & \Theta & \cdots & \Theta \\ \vdots & \vdots & \vdots & \vdots & \ddots & \vdots \\ \tilde{A}_m & \Theta & \Theta & \Theta & \cdots & -F \end{bmatrix} \begin{bmatrix} x \\ z_1 \\ z_2 \\ \vdots \\ z_M \end{bmatrix} = 0$$

where $\tilde{A}_m = D_{y_m}^{-1} A_m$, and $\Theta$ is a matrix with all entries equal to zero.

Some embodiments seek a solution to this model, by determining x and $z_m$ that make the left-hand side of the equation as close to zero as possible. In some embodiments exact equality will not be possible because the measurements of the data include noise. However, even in the presence of noise, this problem is under-determined, i.e., the left-hand side has multiple solutions that are equal to zero. Furthermore, any solution that makes the left-hand side equal to zero can be scaled by any scalar, and the left hand is still be zero. In addition, the sum of any pair of solutions is also a solution, i.e., makes the left-hand side equal to zero. Thus, the presence of a single non-zero solution means that an infinite number of solutions are possible. Furthermore, $x=0$, and $z_m=0$, for all m is always solution, albeit trivial and meaningless.

Thus, some embodiments impose further constraints to determine a solution to the above system of equations. For example, since $z_m$ is a delay, it should be sparse and sum to 1, i.e., satisfy $1^T z_m = 1$, where 1 is a vector with all the coefficients equal to 1, and $1^T$ is its transpose. Some embodiments promote or enforce the sparsity of $z_m$ using a regularization with a one norm of $z_m$, i.e., $|z_m|_1$.

Some embodiments may further require that the reflectivity image x is sparse in some basis, such as the canonical basis, or may have a sparse gradient, i.e., a low total variation (TV). Additionally, or alternatively, some embodiments enforce the sparsity using a fused Lasso regularization including a combination of a one norm of the radar image and a total variation (TV) norm of the radar image. Alternatively, or additionally, some embodiments require that sum of coefficients of the reflectivity image x is positive and approximately equal to a pre-determined constant c.

FIG. 6B shows an exemplar formulation of a convex sparse recovery problem in the matrix form according to some embodiments. Specifically, an example embodiment may solve the following optimization problem to determine the solution, which imposes all of the above constraints:

$$\underset{x,\{z_m\}_{m=1}^M}{\text{minimize}} \lambda_x \|x\|_1 + \lambda_z \sum_{m=1}^{M} \|z_m\|_1 + \left\| \begin{bmatrix} \tilde{A}_1 & -F & \Theta & \Theta & \cdots & \Theta \\ \tilde{A}_2 & \Theta & -F & \Theta & \cdots & \Theta \\ \vdots & \vdots & \vdots & \vdots & \ddots & \vdots \\ \tilde{A}_M & \Theta & \Theta & \Theta & \cdots & -F \\ \gamma 1_N^T & 0_P^T & 0_P^T & 0_P^T & \cdots & 0_P^T \end{bmatrix} \begin{bmatrix} x \\ z_1 \\ z_2 \\ \vdots \\ z_M \end{bmatrix} - \begin{bmatrix} 0 \\ 0 \\ \vdots \\ 0 \\ \gamma c \end{bmatrix} \right\|_2^2 \quad (11)$$

subject to: $x \geq 0_N$, $z_m \geq 0_P$, $1^T z_m = 1$, $\forall m$

In (11), $\gamma$ determines how strongly should the optimization enforce the requirement that the sum of coefficients of the reflectivity image x is approximately equal to a predetermined constant c, and $\gamma_x$ and $\gamma_z$ balance the sparsity of x and $z_m$ with determining x and $z_m$ that make the left-hand side of the model equal to zero. Other embodiments may replace the sparse regularization $|x|_1$, which promotes the sparsity of x in a canonical domain, with another regularization, promoting a low total variation or the sparsity of x in a basis.

The problem in (11) is a convex sparse recovery problem, and, therefore, admits a computationally tractable and efficient solution. Furthermore, convexity guarantees that an optimum will be global and, therefore, the optimization algorithm will not provide a solution that is only locally optimal. Some embodiments, solve the convex sparse recovery problem iteratively until a termination condition is met to produce the radar image. In such a manner, an iteration produces an estimate of the radar image and the time shifts such that an error or a cost (11) including a difference between the time shifted radar measurements of each antenna from the set of antennas and the signal generated by propagation of the radar pulse through a radar propagation function of the scene is reduced.

FIG. 6C shows a pseudo code of solving the convex sparse recovery problem according to one embodiment. In this embodiment, the processor solves the radar image recovery problem using a fast iterative shrinkage thresholding algorithm (FISTA). The FISTA iterates to reduce the error or the cost (11).

For example, FISTA iterates between computing a gradient step (2), thresholding using a shrinkage operator (3), projecting to a constraint set (4), updating a stepsize (5) and updating a solution estimate according to the stepsize (6). After every iteration the error being minimized in (11) is reduced. The algorithm iterates until stopping criteria are satisfied, such as an error dropping below a maximum tolerable error, or an error stops improving in each iteration, or some pre-determined number of iterations is reached, for example.

Additionally, or alternatively, different embodiments use other methods to solve the convex sparse recovery problem. For example, other embodiments use other solvers, such as variants of an iterative shrinkage thresholding algorithm (ISTA) which omits step 5 in the FISTA and sets step 6 to $w^j = u^j$. Some other embodiments use other convex optimization algorithms, such as second order interior point algorithms, or might use an alternating direction method of multipliers (ADMM) and/or might use disciplined convex programming to convert this optimization problem to a standard form that can be solved with a generic optimization solver, such as CVX. Yet some other embodiments use a greedy algorithm to directly impose the sparsity constraints on x and $z_m$, exploiting the convexity and smoothness of the quadratic part of the cost function.

Figure 7:
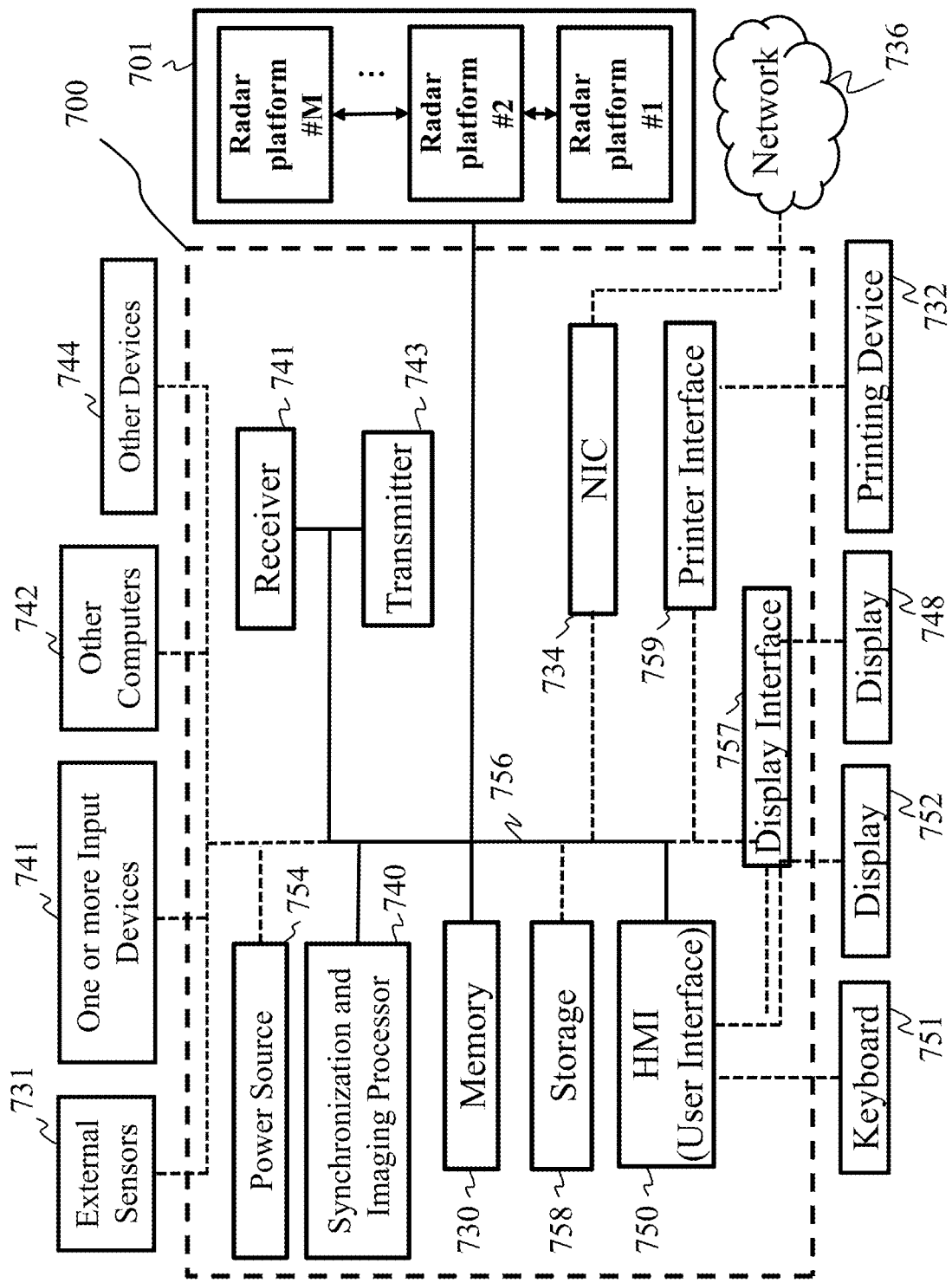
FIG. 7 is a block diagram of a computer system of the radar system contemplated by the present disclosure, in accordance with some embodiments.

FIG. 7 is a block diagram of a computer system of the radar system contemplated by the present disclosure, in accordance with some embodiments. The computer system 700 is in communication with the set of antennas 101, 102, 103, 104, 105 and can store collected data in the memory 730 that is processed by the processor 740 of the computer 700. The computer system 700 can include a human machine interface or user interface 750 that can connect the computer system to a keyboard 751 and display device 752. The computer system 700 can be linked through the bus 756 to a display interface 757 adapted to connect the system 700 to a display device 748, wherein the display device 748 can include a computer monitor, camera, television, projector, or mobile device, among others.

The computer system 700 can include a power source 754, depending upon the application the power source may be optionally located outside of the computer system. The synchronization and imaging processor 740 maybe one or more processors that can be configured to execute stored instructions, as well as be in communication with the memory 730 that stores instructions that are executable by the synchronization and imaging processor 740. The synchronization and imaging processor 740 can be a single core processor, a multi-core processor, a computing cluster, or any number of other configurations. The synchronization and imaging processor 740 is connected through a bus 756 to one or more input and output devices. The memory 730 can include random access memory (RAM), read only memory (ROM), flash memory, or any other suitable memory systems.

Still referring to FIG. 7, the computer system 700 can also include a storage device 758 adapted to store supplementary data and/or software modules used by the synchronization and imaging processor 740. For example, the storage device 758 can store historical data relating to predesigned radar platform trajectories, radar operating frequency bandwidth, transmitted waveform, estimated signal-to-noise ratio, image data relating to target recognition, imaging results using simulated noisy data with different methods dealing with position errors, among other things. The storage device 358 can include a hard drive, an optical drive, a thumb-drive, an array of drives, or any combinations thereof.

Still referring to FIG. 7, a printer interface 759 can also be connected to the computer system 700 through the bus 756 and adapted to connect the computer system 700 to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect the computer system 700 through the bus 756 to a network 736. The image data or related image data, among other things, can be rendered on a display device, imaging device, and/or printing device via the network 736.

Still referring to FIG. 7, the image data or related image data, among other things, can be transmitted over a communication channel of the network 736, and/or stored within the computer's storage system 758 for storage and/or further processing. Further, the image data or related image data may be received wirelessly or wire from a receiver 741 or transmitted via a transmitter 743 wirelessly or wire, the receiver 741 and transmitter 743 are both connected to the computer system 700 through the bus 756.

The computer system 700 may be connected to external sensors 731, one or more input devices 741, other computers 742 and other devices 744. The external sensors 731 may include motion sensors, inertial sensors, a type of measuring sensor, etc. The external sensors 731 may include sensors for, speed, direction, air flow, distance to an object or location, weather conditions, etc. The input devices 741 can include, for example, a keyboard, a scanner, a microphone, a stylus, a touch sensitive pad or display.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of our present disclosure include coherent distributed radar imaging by allowing clock errors, and synchronization of distributed sensing with multiple sensors. In particular, a multi-static radar imaging approach where one or more transmitting/receiving radar platforms and multiple receiving radar platforms are moving towards a region of interest (ROI), each with clock errors. The embodiments of our present disclosure detect targets inside the ROI. Although the image resolution of each sensor array may be low due to its small aperture size, a high-resolution image can be formed by jointly processing the outputs of all distributed arrays with well-compensated clock errors. The embodiments of our present disclosure assume a sparse scene, and is realized iteratively by solving a convex optimization problem, simultaneously compensating clock-induced phase errors, exploiting target signatures, and reconstructing an image of the ROI.

The embodiments of our present disclosure also provide for auto-focus radar imaging for generating a radar image of targets situated in an area of interest using a single moving transmit radar platform or combination transmitter/receiver along with multiple spatially distributed moving radar receiver platforms or receivers. The moving radar receivers are perturbed with unknown timing errors.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What claimed is:

1. A radar system for generating a radar image of a scene, comprising:
    an input interface to accept radar measurements of a scene collected from a set of antennas with clock ambiguities, wherein the radar measurements are measurements of reflections of a radar pulse transmitted to the scene;
    a hardware processor configured to solve a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time, wherein the processor solves the convex sparse recovery problem with a regularizer reducing a number of solutions of the convex sparse recovery problem; and
    an output interface configured to render the radar image.

2. The radar system of claim 1, wherein the processor solves the convex sparse recovery problem subject to a sparsity constraint on the radar image to recover a sparse radar image of the scene.

3. The radar system of claim 1, wherein the processor solves the convex sparse recovery problem subject to a sparsity constraint on the shift kernel to recover a sparse radar image of the scene.

4. The radar system of claim 1, wherein the regularizer is a total variation regularizer on the radar image.

5. The radar system of claim 1, wherein the regularizer is a sparsity regularizer on the radar image.

6. The radar system of claim 5, wherein the sparsity regularizer on the radar image is a one-norm of the radar image or of a basis transformation of the radar image.

7. The radar system of claim 1, wherein the regularizer is a fused LASSO regularizer on the image.

8. The radar system of claim 1, wherein the regularizer is a sparsity regularizer on the shift kernel.

9. The radar system of claim 8, wherein the sparsity regularizer on the shift kernel is a one-norm of the shift kernel.

10. The radar system of claim 1, wherein the time shift includes a relative time shift between clocks in each receiver and transmitter pair.

11. The radar system of claim 1, wherein the processor solves the convex sparse recovery problem iteratively until a termination condition is met to produce the radar image, wherein to perform an iteration the processor is configured to produce an estimate of the radar image and the time shifts such that an error between the time shifted radar measurements of each antenna from the set of antennas and the signal generated by propagation of the radar pulse through a radar propagation function of the scene is reduced.

12. The radar system of claim 11, wherein the processor solves the convex sparse recovery problem using one or combination of a fast iterative shrinkage thresholding algorithm (FISTA), an iterative shrinkage thresholding algorithm (ISTA), a disciplined convex programming, and alternating direction method of multipliers (ADMM), and a greedy optimization.

13. The radar system of claim 1, wherein each antenna in the set of antennas is at a different position in relation to the scene or some antennas in the set of antennas are at different positions in relation to the scene.

14. The radar system of claim 1, wherein some antennas of the set of antennas transmit radar pulses to the scene and measure a set of reflections from the scene.

15. The radar system of claim 1, wherein the matching of the reflections of the radar measurements of each antenna from the set of antennas is by minimizing an error between time shifted measurements of each antenna from the set of antennas and the signal generated by propagation of the radar pulse through a radar propagation function.

16. A radar method for generating a radar image of a scene, wherein the method uses a processor coupled with stored instructions implementing the method, wherein the instructions, when executed by the processor carry out steps of the method, comprising:
  accepting radar measurements of a scene collected from a set of antennas with clock ambiguities, wherein the radar measurements are measurements of reflections of a radar pulse transmitted to the scene;
  solving a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time, wherein the convex sparse recovery problem is solved iteratively until a termination condition is met to produce the radar image, wherein for an iteration an estimate of the radar image and the time shifts are determined such that an error between the time shifted radar measurements of each antenna from the set of antennas and the signal generated by propagation of the radar pulse through a radar propagation function of the scene is reduced, wherein the convex sparse recovery problem is solved using one or combination of a fast iterative shrinkage thresholding algorithm (FISTA), an iterative shrinkage thresholding algorithm (ISTA), a disciplined convex programming, and alternating direction method of multipliers (ADMM), and a greedy optimization; and
  rendering the radar image.

17. A non-transitory computer-readable storage medium embodied thereon a program executable by a processor for performing a method, the method comprising:
  accepting radar measurements of a scene collected from a set of antennas with clock ambiguities, wherein the radar measurements are measurements of reflections of a radar pulse transmitted to the scene;
  solving a convex sparse recovery problem to produce a radar image of the scene, wherein the convex sparse recovery problem matches a time shift of the radar measurements with a signal generated by propagation of the radar pulse through a radar propagation function of the scene, wherein the time shift of the radar measurements is represented as a convolution of the radar measurements with a shift kernel that is one-sparse in time, wherein the convex sparse recovery problem is solved using one or a combination of a fast iterative shrinkage thresholding algorithm (FISTA), an iterative shrinkage thresholding algorithm (ISTA), a disciplined convex programming, and alternating direction method of multipliers (ADMM), and a greedy optimization; and
  rendering the radar image.

* * * * *